United States Patent
Maejima et al.

(10) Patent No.: US 10,092,847 B2
(45) Date of Patent: Oct. 9, 2018

(54) METHOD FOR GENERATING AND DISPLAYING IMAGE OF VIRTUAL SPACE, ELECTRONIC DEVICE AND SERVER SYSTEM

(71) Applicant: BANDAI NAMCO ENTERTAINMENT INC., Tokyo (JP)

(72) Inventors: Kazuhito Maejima, Tokyo (JP); Masaki Matsumoto, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/264,192

(22) Filed: Sep. 13, 2016

(65) Prior Publication Data

US 2017/0072311 A1 Mar. 16, 2017

(30) Foreign Application Priority Data

Sep. 16, 2015 (JP) .................................. 2015-183383

(51) Int. Cl.
A63F 9/00 (2006.01)
A63F 13/92 (2014.01)
A63F 13/35 (2014.01)
A63F 13/2145 (2014.01)
A63F 13/42 (2014.01)

(52) U.S. Cl.
CPC .......... *A63F 13/92* (2014.09); *A63F 13/2145* (2014.09); *A63F 13/35* (2014.09); *A63F 13/42* (2014.09)

(58) Field of Classification Search
None
See application file for complete search history.

(56) References Cited

U.S. PATENT DOCUMENTS

| | | | |
|---|---|---|---|
| 9,643,087 B2 * | 5/2017 | Naoi | A63F 13/2145 |
| 9,682,322 B2 * | 6/2017 | Suzuki | A63F 13/58 |
| 2012/0252577 A1 * | 10/2012 | Webster | A63F 13/92 463/31 |
| 2014/0248948 A1 * | 9/2014 | Ho | A63F 13/04 463/31 |
| 2014/0287830 A1 | 9/2014 | Katou et al. | |
| 2014/0302935 A1 * | 10/2014 | Royce | A63F 13/822 463/42 |

(Continued)

FOREIGN PATENT DOCUMENTS

| | | |
|---|---|---|
| JP | 2014-184058 A | 10/2014 |
| JP | 2015-008941 A | 1/2015 |

*Primary Examiner* — Seng H Lim
(74) *Attorney, Agent, or Firm* — Oliff PLC

(57) ABSTRACT

A player character is placed so as to be linked to a given edge position of a board. A plurality of puzzle pieces including an enemy character piece that represents an enemy character are placed on the board. The player inputs a selection path from the puzzle piece situated at the given edge position or the player character without removing the finger from the board so as to select and delete puzzle pieces among the plurality of puzzle pieces that are placed on the board and belong to an identical type, or are considered to belong to an identical type. When the enemy character piece lies in the selection path, the player character that corresponds to the puzzle piece set to be the start point, or the player character set to be the start point, attacks the enemy character represented by the enemy character piece.

17 Claims, 28 Drawing Sheets

(56) References Cited

U.S. PATENT DOCUMENTS

| | | | |
|---|---|---|---|
| 2015/0080073 A1* | 3/2015 | Naoi | A63F 13/2145 463/9 |
| 2015/0094145 A1* | 4/2015 | Suzuki | A63F 13/58 463/31 |
| 2015/0224403 A1* | 8/2015 | Hisaoka | A63F 13/537 463/29 |
| 2015/0238861 A1* | 8/2015 | Inamori | A63F 13/537 463/31 |
| 2016/0038831 A1* | 2/2016 | Katou | A63F 13/42 463/31 |
| 2016/0124518 A1* | 5/2016 | Takahashi | G06F 3/04842 463/31 |
| 2016/0139773 A1* | 5/2016 | Kodisoja | A63F 13/80 463/33 |
| 2016/0214014 A1* | 7/2016 | Shiota | A63F 13/2145 |
| 2017/0106279 A1* | 4/2017 | Hisaoka | A63F 13/35 |
| 2017/0209785 A1* | 7/2017 | Park | A63F 9/0612 |

* cited by examiner

| 720 | BOARD MANAGEMENT DATA | | | |
|---|---|---|---|---|
| | 721 | 722 | 723 | |
| | PLACEMENT COORDINATES | PLACED PIECE TYPE | RESTORATION TARGET TYPE | ... |
| | (X1, Y1) | WHITE | NULL | ... |
| | (X1, Y2) | HORIZONTAL-STRIPED | NULL | ... |
| | (X1, Y3) | CROSS-HATCHED | NULL | ... |
| | (X1, Y4) | DENSELY-HATCHED | NULL | ... |
| | ⋮ | ⋮ | ⋮ | ⋮ |

METHOD FOR GENERATING AND DISPLAYING IMAGE OF VIRTUAL SPACE, ELECTRONIC DEVICE AND SERVER SYSTEM

Japanese Patent Application No. 2015-183383 filed on Sep. 16, 2015, is hereby incorporated by reference in its entirety.

BACKGROUND

A puzzle game is a popular video game. A game in which a puzzle game is combined with a second game that proceeds along with the puzzle game (i.e., a game that includes a plurality of game elements), is also known.

Examples of the latter include a puzzle role-playing game (RPG). The puzzle RPG is a game in which a puzzle game is combined with an RPG More specifically, the puzzle RPG allows the player to simultaneously enjoy a puzzle game (in which the player rearranges various types of pieces placed on a board to form and delete a group of pieces that belong to an identical type and are arranged in the vertical direction and the horizontal direction, or deletes a group of pieces from the board by performing an instruction operation) and an RPG (role-playing game) that proceeds while a player character defeats an enemy character (see JP-A-2014-184058 and JP-A-2015-008941, for example).

The player may immediately lose interest in the puzzle game and the puzzle RPG (that includes the puzzle game as a game element) if the puzzle game is not interesting.

SUMMARY

According to one aspect of the invention, there is provided a method for causing a computer to generate an image of a virtual space, and display the generated image on a display device, the method comprising:

causing the computer to set a board within the virtual space, a plurality of pieces being placed on the board;

causing the computer to link a given position of an edge of the board (hereinafter referred to as "given edge position") to a given character placement position;

causing the computer to place a player character at the character placement position;

causing the computer to place an enemy character piece on the board, the enemy character piece representing an enemy character;

causing the computer to detect a path that has been drawn by a player by performing an operation input on the display device so as to draw the path from a start point, the start point being the given edge position or the character placement position;

causing the computer to delete pieces among the plurality of pieces that have satisfied a given deletion condition from the board based on the path;

causing the computer to perform a control process that causes the player character placed at a position that corresponds to the start point of the path to attack the enemy character piece when the enemy character piece lies in the path;

causing the computer to change a parameter value set to the enemy character piece based on a number of pieces deleted due to the operation input that draws the path, and a type of the player character placed at the position that corresponds to the start point of the path, when the enemy character piece lies in the path; and causing the computer to place an additional piece on the board after completion of the deletion.

According to another aspect of the invention, there is provided an electronic device comprising a computer that generates an image of a virtual space, and displays the generated image on a display device, wherein the computer is configured to:

set a board within the virtual space, a plurality of pieces being placed on the board;

link a given position of an edge of the board (hereinafter referred to as "given edge position") to a given character placement position;

place a player character at the character placement position;

place an enemy character piece on the board, the enemy character piece representing an enemy character;

detect a path that has been drawn by a player by performing an operation input on the display device so as to draw the path from a start point, the start point being the given edge position or the character placement position;

delete pieces among the plurality of pieces that have satisfied a given deletion condition from the board based on the path;

perform a control process that causes the player character placed at a position that corresponds to the start point of the path to attack the enemy character piece when the enemy character piece lies in the path;

change a parameter value set to the enemy character piece based on a number of pieces deleted due to the operation input that draws the path, and a type of the player character placed at the position that corresponds to the start point of the path, when the enemy character piece lies in the path; and place an additional piece on the board after completion of the deletion.

According to another aspect of the invention, there is provided a server system that communicates with a player terminal, and performs a control process that causes the player terminal to implement a puzzle game according to an operation input performed using the player terminal, the puzzle game being designed so that a player performs an operation input on a board on which a plurality of pieces are placed, pieces among the plurality of pieces that have satisfied a given deletion condition are deleted, and an additional piece is placed on the board, the server system being configured to:

link a given position of an edge of the board (hereinafter referred to as "given edge position") to a given character placement position;

place a player character at the character placement position;

place an enemy character piece on the board, the enemy character piece representing an enemy character;

detect a path that has been drawn by the player by performing the operation input using the player terminal so as to draw the path from a start point, the start point being the given edge position or the character placement position;

delete pieces among the plurality of pieces that have satisfied the deletion condition from the board based on the path;

perform a control process that causes the player character placed at a position that corresponds to the start point of the path to attack the enemy character piece when the enemy character piece lies in the path; and change a parameter value set to the enemy character piece based on a number of pieces deleted due to the operation input that draws the path, and a type of the player character placed at the position that corresponds to the start point of the path, when the enemy character piece lies in the path.

DESCRIPTION OF EXEMPLARY EMBODIMENTS

Figure 1:
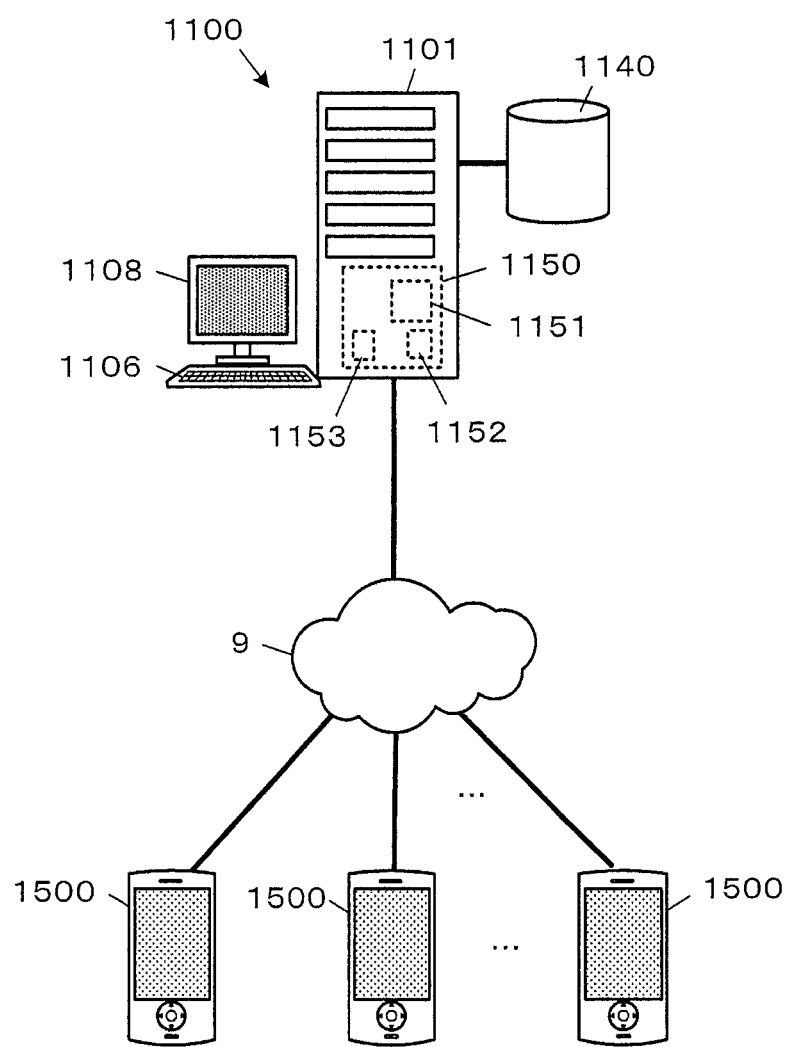
FIG. 1 is a view illustrating an example of the configuration of a game system.

According to one embodiment of the invention, there is provided a method for causing a computer to generate an image of a virtual space, and display the generated image on a display device, the method comprising:

causing the computer to set a board within the virtual space, a plurality of pieces being placed on the board;

causing the computer to link a given position of an edge of the board (hereinafter referred to as "given edge position") to a given character placement position;

causing the computer to place a player character at the character placement position;

causing the computer to place an enemy character piece on the board, the enemy character piece representing an enemy character;

causing the computer to detect a path that has been drawn by a player by performing an operation input on the display device so as to draw the path from a start point, the start point being the given edge position or the character placement position;

causing the computer to delete pieces among the plurality of pieces that have satisfied a given deletion condition from the board based on the path;

causing the computer to perform a control process that causes the player character placed at a position that corresponds to the start point of the path to attack the enemy character piece when the enemy character piece lies in the path;

causing the computer to change a parameter value set to the enemy character piece based on a number of pieces deleted due to the operation input that draws the path, and a type of the player character placed at the position that corresponds to the start point of the path, when the enemy character piece lies in the path; and causing the computer to place an additional piece on the board after completion of the deletion.

According to another embodiment of the invention, there is provided an electronic device comprising a computer that generates an image of a virtual space, and displays the generated image on a display device, wherein the computer is configured to:

set a board within the virtual space, a plurality of pieces being placed on the board;

link a given position of an edge of the board (hereinafter referred to as "given edge position") to a given character placement position;

place a player character at the character placement position;

place an enemy character piece on the board, the enemy character piece representing an enemy character;

detect a path that has been drawn by a player by performing an operation input on the display device so as to draw the path from a start point, the start point being the given edge position or the character placement position;

delete pieces among the plurality of pieces that have satisfied a given deletion condition from the board based on the path;

perform a control process that causes the player character placed at a position that corresponds to the start point of the path to attack the enemy character piece when the enemy character piece lies in the path;

change a parameter value set to the enemy character piece based on a number of pieces deleted due to the operation input that draws the path, and a type of the player character placed at the position that corresponds to the start point of the path, when the enemy character piece lies in the path; and place an additional piece on the board after completion of the deletion.

According to another embodiment of the invention, there is provided a server system that communicates with a player terminal, and performs a control process that causes the player terminal to implement a puzzle game according to an operation input performed using the player terminal, the puzzle game being designed so that a player performs an operation input on a board on which a plurality of pieces are placed, pieces among the plurality of pieces that have satisfied a given deletion condition are deleted, and an additional piece is placed on the board, the server system being configured to:

link a given position of an edge of the board (hereinafter referred to as "given edge position") to a given character placement position;

place a player character at the character placement position;

place an enemy character piece on the board, the enemy character piece representing an enemy character;

detect a path that has been drawn by the player by performing the operation input using the player terminal so as to draw the path from a start point, the start point being the given edge position or the character placement position;

delete pieces among the plurality of pieces that have satisfied the deletion condition from the board based on the path;

perform a control process that causes the player character placed at a position that corresponds to the start point of the path to attack the enemy character piece when the enemy character piece lies in the path; and change a parameter value set to the enemy character piece based on a number of pieces deleted due to the operation input that draws the path, and a type of the player character placed at the position that corresponds to the start point of the path, when the enemy character piece lies in the path.

According to the above configuration, the player can select the desired player character to be a player character that implements an attack by appropriately selecting the start point of the path when performing the operation input that draws the path. The player can designate the attack target enemy character by drawing the path so that the desired enemy character piece lies in the path. Therefore, it is possible to utilize the placement position of the player character as an element that must be taken into consideration in order to solve the puzzle, and improve the interest of the puzzle game.

The method may further comprise:

causing the computer to control deletion of the enemy character piece based on the parameter value.

This makes it possible to delete the enemy character piece based on the parameter value of the enemy character piece that is changed due to an attack implemented by the player character.

The method may further comprise:

causing the computer to change the character placement position corresponding to an operation input performed by the player.

According to this configuration, the player can change the placement position of the player character (4). This makes it possible to increase the number of elements that must be taken into consideration in order to solve the puzzle, and further improve the interest of the puzzle game.

The method may further comprise:

causing the computer to change the parameter value using a number of successive attacks when the attack has been successively performed by repeating the operation input that draws the path.

This makes it possible to implement a combo attack that changes in attack power corresponding to the number of successive attacks, for example.

The method may further comprise:

causing the computer to perform a control process that repeatedly switches between a player's turn in which the player can input the path, and an enemy's turn in which the enemy character attacks the player character.

According to this configuration, it is possible to implement turn-based game play.

The method may further comprise:

causing the computer to terminate the player's turn when a given time has elapsed, or a given turn count has been reached, after a first operation input that draws the path has been performed during the player's turn; and causing the computer to change the parameter value using a number of attacks when a plurality of attacks have been performed during the player's turn by repeating the operation input that draws the path.

The method may further comprise:

causing the computer to change the given time or the given turn count.

According to this configuration, since the player's turn is terminated when a given time has elapsed, or a given turn count has been reached after the first operation input that draws the path has been performed during the player's turn, the player can take time to perform the operation input. Moreover, the amount of damage to the enemy character can be changed corresponding to the number of attacks implemented during the player's turn. Specifically, it is possible to provide a novel interesting feature in which the player can obtain advantages by improving his/her skill to quickly perform the operation input during the player's turn.

The method may further comprise:

causing the computer to display a path line that represents the path while changing a state of the path line using either or both of the number of pieces deleted due to the operation input that draws the path, and the type of the player character placed at the position that corresponds to the start point of the path.

The method may further comprise:

causing the computer to change the state of the path line corresponding to the attack when the enemy character piece lies on the path line.

According to this configuration, the display state of the path line can be changed corresponding to the path selection result. This makes it possible to notify the player of the selection result, and implement various types of effective display. Therefore, it is possible to further improve the interest of the puzzle game.

The method may further comprise:

causing the computer to highlight the player character and the enemy character represented by the enemy character piece when performing the control process that causes the player character to attack the enemy character piece.

According to this configuration, it is possible to further improve the interest of the puzzle game by expressly displaying the attacker and the attack target.

In the method, wherein the plurality of pieces may include pieces that respectively belong to given types, and a free piece that is determined to belong to each of the given types, the method may further comprise:

causing the computer to place the free piece as the additional piece when a given implementation condition based on the number of pieces deleted has been satisfied.

According to this configuration, it is possible to place the free piece that is determined to belong to each type on the board when at least the number of pieces deleted due to the operation input that draws the path has reached the given implementation condition.

The method may further comprise:

causing the computer to perform a control process that counts the number of pieces deleted due to the operation input that draws the path corresponding to each player character placed at the position that corresponds to the start point of the path, and causes the player character for which the number of pieces deleted due to the operation input that draws the path has satisfied a given skill implementation threshold value condition, to implement a given skill.

According to this configuration, it is possible to cause the player character to implement a skill in a state in which the player character has been charged with respect to the attack capability using the number of pieces deleted.

The method may further comprise:

causing the computer to detect a given special state in which the plurality of pieces are placed so that no piece can be deleted by the operation input that draws the path; and causing the computer to change types of the plurality of pieces placed on the board other than a piece that belongs to a given type, to an identical type when the special state has been detected.

According to this configuration, it is possible to easily cancel a state in which it is impossible to solve the puzzle. On the other hand, the types of the pieces placed on the board are changed to an identical type. Therefore, the player can delete the pieces by selecting an arbitrary path. Specifically, the above feature can be used as a bonus time for the player.

In the method, wherein the deletion condition may includes a condition whereby the operation input that draws the path has been performed so that two pieces among the plurality of pieces are sequentially selected so as to satisfy a given connection condition with respect to a type, the method may comprise:

causing the computer to determine that the path has ended immediately before a piece among the plurality of pieces has been selected so as not to satisfy the connection condition, and terminates the operation input that draws the path when the connection condition has not been satisfied during the operation input that draws the path.

In the method, wherein the display device may be a touch panel, and the operation input that draws the path may be performed by a touch operation.

According to this configuration, it is possible to forcibly terminate the operation input that draws the path when the path designation rules (i.e., the connection condition must be satisfied) have not been met. It is possible to bring a moderate sense of tension with respect to the operation input by strictly determining an erroneous path designation operation input. When the operation input is implemented by moving a finger on a touch panel, it is possible to easily complete the operation input by moving a finger on a touch panel so that the type of the piece that lies at the end of the path does not satisfy the connection condition. This makes it possible to improve operability.

Exemplary embodiments to which the invention is applied are described in detail below. Note that the following exemplary embodiments do not in any way limit the scope of the invention defined by the claims laid out herein. Note also that all of the elements described below in connection with the exemplary embodiments should not necessarily be taken as essential elements of the invention.

FIG. 1 is a view illustrating an example of the configuration of a game system according to one embodiment of the invention. The game system according to one embodiment of the invention includes a server system 1100 and a player terminal 1500 that can exchange data through a communication line 9.

The communication line 9 is a data communication channel. Specifically, the communication line 9 includes a communication network such as a local area network (LAN) using a private line (private cable) for direct connection, Ethernet (registered trademark), and the like, a telecommunication network, a cable network, and the Internet. The communication method may be either or both of a cable communication method and a wireless communication method.

The server system 1100 includes a main device 1101, a keyboard 1106, a touch panel 1108, and a storage 1140. The main device 1101 includes a control board 1150.

The control board 1150 is provided with a microprocessor (e.g., central processing unit (CPU) 1151, graphics processing unit (GPU), and digital signal processor (DSP)), an IC memory 1152 (e.g., VRAM, RAM, and ROM), and a communication device 1153. Note that part or the entirety of the control board 1150 may be implemented by an application-specific integrated circuit (ASIC), a field-programmable gate array (FPGA), or a system-on-a-chip (SoC).

The server system 1100 is configured so that the control board 1150 performs a calculation process based on a given program and data to implement 1) a user management function (e.g., user registration function), 2) a game management function that provides data necessary for the player (i.e., user) to play the game using the player terminal 1500, and manages a game control process performed by the player terminal 1500, and 3) an online shopping function that sells a character, an item, and the like that can be used in the game to the user. Specifically, the game according to one embodiment of the invention is implemented in the form of a client-server online game.

In the example illustrated in FIG. 1, the server system 1100 is provided as a single server system. Note that the server system 1100 may have a configuration in which a plurality of blade servers that take charge of part of the respective functions are connected to each other through an internal bus so as to be able to exchange data. Alternatively, the function of the server system 1100 may be implemented by causing a plurality of independent servers provided in remote locations to exchange data through the communication line 9.

Figure 2:
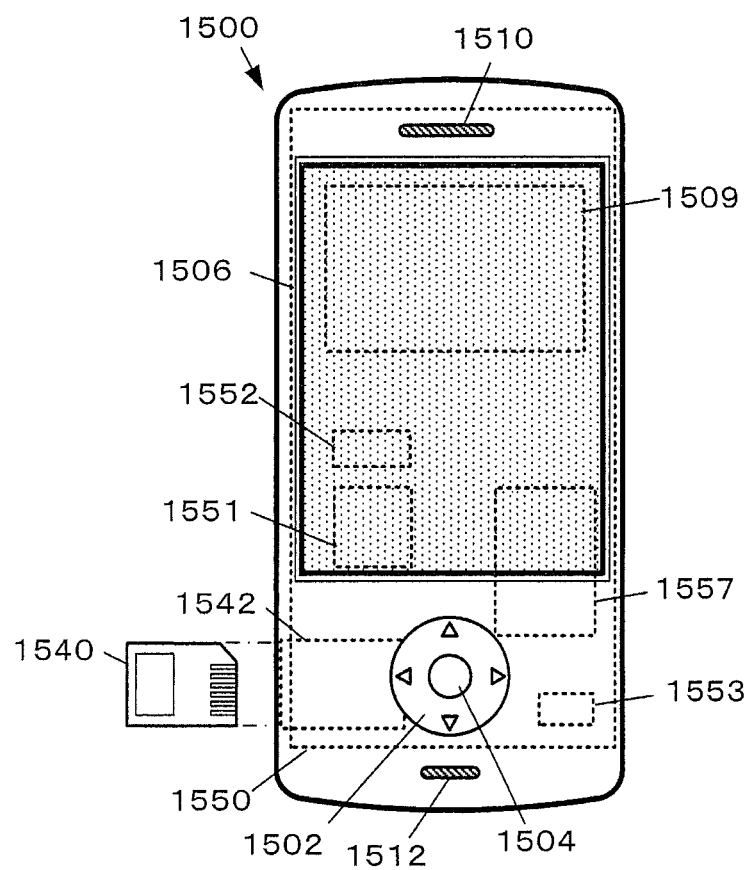
FIG. 2 is a front external view illustrating a configuration example of a player terminal.

FIG. 2 is a front external view illustrating a configuration example of the player terminal 1500.

The player terminal 1500 is a computer that can be used by the user (i.e., player) to play the game. The player terminal 1500 is a computer (electronic device) that can access the server system 1100 through the communication line 9, and execute the online game. The player terminal 1500 according to one embodiment of the invention is a device that is classified as a smartphone. Note that the player terminal 1500 may be a device that is classified as a portable game device, a game controller, a personal computer, a tablet computer, a wearable computer, an arcade game device, or the like.

The player terminal 1500 includes an arrow key 1502, a button switch 1504, a touch panel 1506 that functions as an image display device and a touch position input device, a built-in battery 1509, a speaker 1510, a microphone 1512, a control board 1550, and a memory card reader 1542 that can read and write data from and into a memory card 1540 (i.e., computer-readable storage medium). The player terminal 1500 also includes a power button, a volume control button, and the like (not illustrated in FIG. 2). The player terminal 1500 may include an IC card reader that can read and write data from and into an IC card (e.g., credit card or prepaid card) (that can be used for the payment of a game play fee) in a non-contact manner, for example.

The control board 1550 is provided with a microprocessor (e.g., CPU 1551, GPU, and DSP), an IC memory 1552 (e.g., VRAM, RAM, and ROM), a wireless communication module 1553 that communicates with a mobile phone base station, a wireless LAN base station, and the like that connect to the communication line 9 via wireless communication, an interface (I/F) circuit 1557, and the like.

The I/F circuit 1557 includes a driver circuit that drives the touch panel 1506, a circuit that receives a signal from the arrow key 1502 and the button switch 1504, an output amplifier circuit that outputs a sound signal to the speaker 1510, an input signal generation circuit that generates a signal from voice collected by the microphone 1512, a signal input-output circuit that inputs and outputs a signal to and from the memory card reader 1542, and the like.

The elements provided to the control board 1550 are electrically connected through a bus circuit or the like so that the elements can exchange data and a signal. Note that part or the entirety of the control board 1550 may be implemented by an ASIC, an FPGA, or an SoC. The control board 1550 temporarily stores a client program and various types of data for the player terminal to implement the game according to one embodiment of the invention in the IC memory 1552.

In one embodiment of the invention, the player terminal 1500 downloads the client program and various types of setting data from the server system 1100. Note that the player terminal 1500 may read the client program and various types of setting data from a storage medium such as the memory card 1540.

Game Rules

Figure 3:
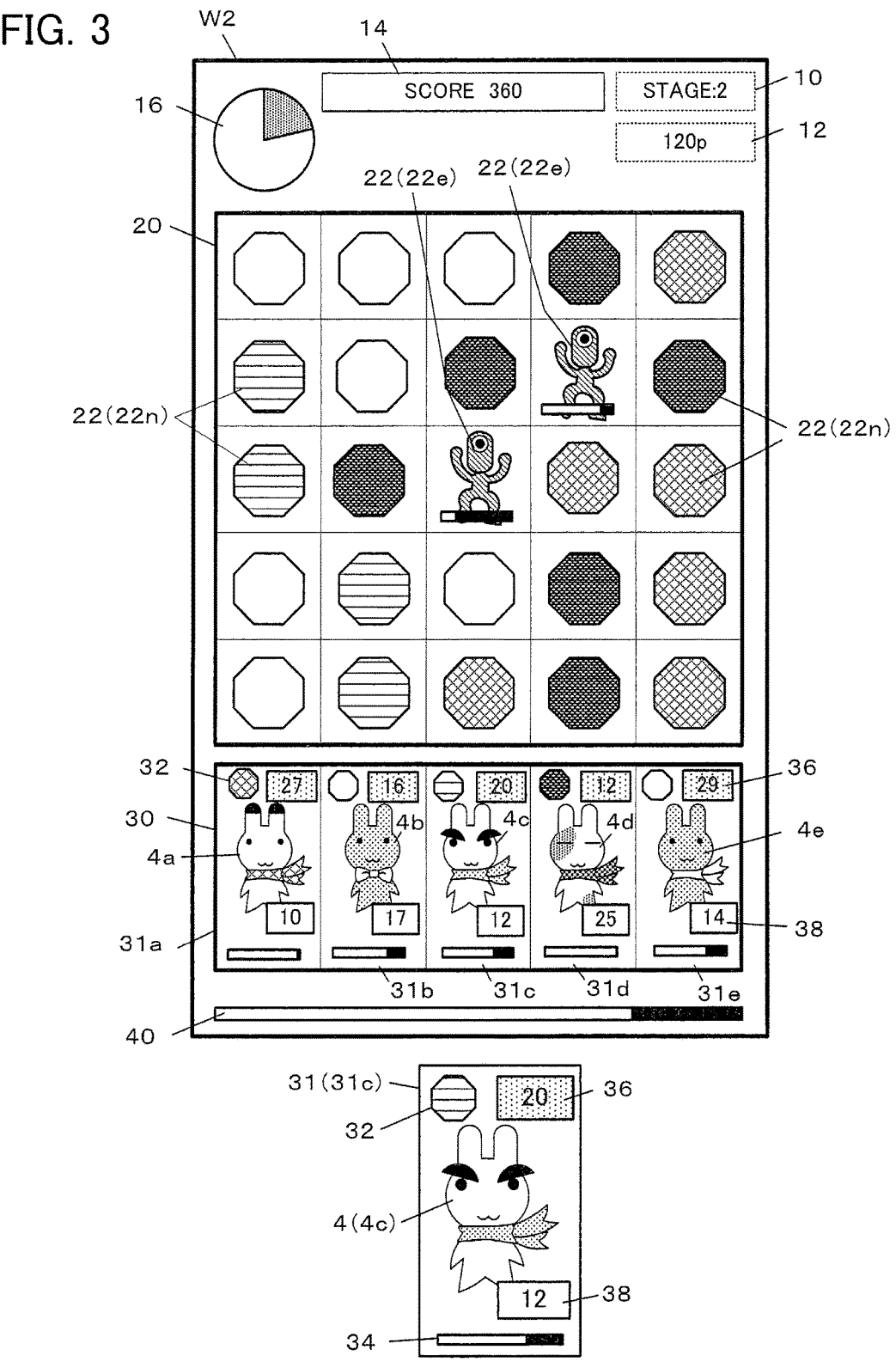
FIG. 3 is a view illustrating an example of a game screen.

FIG. 3 is a view illustrating an example of a game screen according to one embodiment of the invention.

The game according to one embodiment of the invention is a complex game that includes a puzzle game, and a second game that proceeds in synchronization with the progress of the puzzle game. The game according to one embodiment of the invention is a turn-based puzzle RPG game. Specifically, the player causes a player character to attack an enemy character by solving a puzzle. A stage is cleared when all of the enemy characters have been destroyed, and the game is cleared when all of the stages have been cleared.

A game screen W2 displayed on the touch panel 1506 includes a stage ID display area 10, a stage score display area 12, a total score display area 14, a turn information display area 16, a puzzle board 20, a deck 30 (that is used for the RPG), and a total life display area 40.

The turn information display area 16 displays a player's turn and an enemy's turn using different display colors, and also displays a turn control parameter value (e.g., remaining time) using a graphical change. Note that the turn control parameter value is not limited to time. Another parameter value that is used in the game may also be used as the turn control parameter value. For example, an action point parameter value that is consumed when the player character has performed an action may be used as the turn control parameter value. A plurality of sub-turns may be provided to the player's turn, and it may be determined that the player's turn has ended when all of the sub-turns have ended. For example, one action (one operation input) can be performed during one sub-turn. In this case, the number of sub-turns included in one player's turn may be changed corresponding to the progress of the game. Note that the duration of the player's turn may be changed corresponding to the progress of the game.

A plurality of areas in which a puzzle piece 22 is placed are provided to the board 20. The board 20 according to one embodiment of the invention has a configuration in which 5×5 rectangular piece placement frames (placement positions) are arranged in the shape of a rectangle. Note that the shape, the arrangement shape, and the number of piece placement frames may be set appropriately. A puzzle piece 22 among puzzle pieces 22 that differ in type is placed in each piece placement frame provided to the board 20.

The puzzle pieces 22 according to one embodiment of the invention include an enemy character piece 22e that represents an enemy character, and a non-playable character piece 22n that represents a character other than the enemy character. Five types of non-playable character pieces 22n (i.e., four basic non-playable character pieces including a white hexagonal non-playable character piece, a horizontal-striped hexagonal non-playable character piece, a cross-hatched hexagonal non-playable character piece, and a densely-hatched hexagonal non-playable character piece (see FIG. 2), and a free piece 22f described later (see FIG. 9) are provided. Note that the type of non-playable character piece 22n may be set appropriately. The design of each non-playable character piece 22n may also be set appropriately.

Life points (corresponding to hit points) are set to each enemy character piece 22e. The life points are decremented when the enemy character piece 22e has been attacked by a player character 4 during the player's turn, and the enemy character piece 22e is deleted from the board 20 when the life points have reached "0". Note that the type of enemy character piece 22e may be set appropriately.

The deck 30 is an area in which a plurality of player characters 4 can be placed. In one embodiment of the invention, five character placement positions 31 (31a, 31b, . . . ) are provided so as to have a one-to-one relationship with the lower piece placement frames provided to the board 20. Specifically, up to five player characters 4 (4a, 4b, . . . ) can be placed in the deck 30 to form a player's team. Note that the area of the deck 30 in which each player character 4 is placed can be appropriately changed even after starting game play.

The player character 4 that is placed in the deck 30 can be selected from available characters that are registered corresponding to each player. The available characters are registered by performing a given registration process on a character purchased by the player through online shopping or the like, a character obtained by registering a code drawn on a trading card purchased from a store or the like, a character obtained during game play, and the like.

An ability parameter is set to each player character 4 (4a, 4b, . . . ). The ability parameter includes a character attribute, life points, an attack capability, a defense capability, and a skill. Note that another ability parameter may also be set appropriately.

One character attribute is assigned to each character. The character attribute is used to set the compatibility between the player character 4 and each non-playable character piece 22n. The type of character attribute may be set appropriately. In one embodiment of the invention, four character attributes are provided corresponding to the four basic non-playable character pieces 22n. The character attribute is displayed in a character attribute display area 32.

The life points are decremented when the player character 4 has been attacked during the enemy's turn. The player character 4 is disabled when the life points have reached "0", and is deleted from the deck 30. In one embodiment of the invention, the remaining life points of each player character 4 are displayed in an individual life display area 34, and the total life points of all of the player characters 4 are displayed in the total life display area 40.

The attack capability is determined by adding a given addition value (positive value or negative value) to a basic value based on the growth of the player character 4 corresponding to the progress of the game. The latest attack capability is displayed in an attack capability display area 36.

The skill is a specific ability and a special skill such as the recovery of life, and a temporary increase in attack capability and defense capability. The player character 4 can implement the skill when the player character 4 has satisfied a skill implementation condition. In one embodiment of the invention, the skill implementation condition is defined using the integrated value of the number of puzzle pieces 22 that have been deleted in connection with each player character 4. The integrated value is referred to as "skill points". It is determined that the skill implementation condition has been satisfied (i.e., the player character 4 can implement the skill) when the skill points have reached a given threshold value. The skill points are consumed when the player character 4 has implemented the skill. Skill points required to satisfy the skill implementation condition are displayed in a required skill point display area 38 that is provided corresponding to each player character 4.

Figure 4:
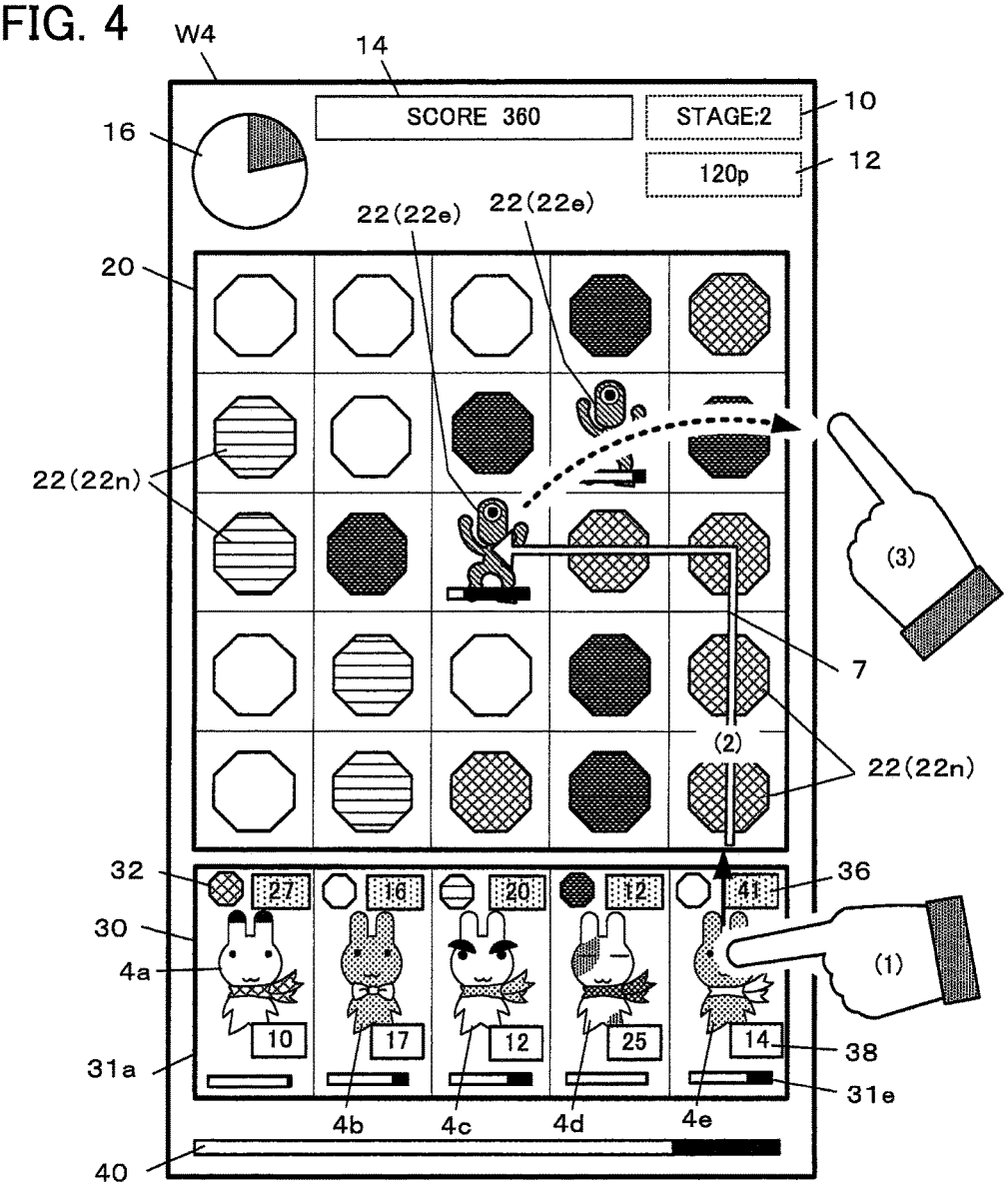
FIG. 4 is a view illustrating an example of an operation input.

FIG. 4 is a view illustrating an example of an operation input.

The puzzle RPG game according to one embodiment of the invention is designed so that the player causes the player character 4 to attack the enemy character piece 22e during the player's turn by solving a puzzle. The player can clear the stage by destroying all of the enemy character pieces 22e specified in advance corresponding to each stage, and can clear the game by clearing a given number of stages.

In the one embodiment of the invention, a puzzle is solved by designating a group of puzzle pieces 22 in a number equal to or larger than a given number (e.g., 3) on the board 20, the puzzle pieces 22 belonging to an identical type, or being considered to belong to an identical type. A group of puzzle pieces 22 is designated by touching the touch panel 1506 with a finger, and sliding the finger on the touch panel 1506 to input a selection path that selects arbitrary puzzle pieces 22 without removing the finger from the touch panel 1506. The player can cause the player character 4 to attack the enemy character piece 22e a number of times during the player's turn by solving a puzzle. One attack is implemented by inputting a selection path so as to designate the enemy character piece 22e that is to be attacked by the player character 4, and the attack capability with which the player character 4 attacks the enemy character piece 22e.

More specifically, the player touches the desired player character 4 among the player characters 4 (4a, 4b, . . . ) placed in the deck 30, or selects the puzzle piece 22 that is situated at a position opposite to the desired player character 4 placed in the deck 30 to designate the attacker (i.e., the player character 4 that attacks the enemy character piece 22e) (see FIG. 4 (see (1))).

The player designates the selection path by sliding the finger on the board 20 without removing the finger from the board 20 to designate the enemy character piece 22e that is to be attacked by the player character 4, and the attack capability with which the player character 4 attacks the enemy character piece 22e (see FIG. 4 (see (2))).

More specifically, the player designates the attack target enemy character piece 22e by designating the selection path so as to include the attack target enemy character piece 22e, and designates the attack capability by designating the selection path so as to include the desired number of non-playable character pieces 22n.

Note that the selection path must be designated in accordance with a given path designation rules.

Specifically, the start point of the selection path must be the character placement position 31 of the player character 4 that has been set to be the attacker, or the puzzle piece 22 that is situated at a position opposite to the character placement position 31.

The selection path must be designated so as to connect puzzle pieces 22 that belong to an identical type or are considered to belong to an identical type, and are contiguous in a given connection-permitted direction (e.g., vertical direction or horizontal direction). Note that the enemy character piece 22e is considered to belong to a type that is identical to that of each non-playable character piece 22n irrespective of the type of enemy character piece 22e. The type of puzzle piece 22 that "belongs to an identical type or is considered to belong to an identical type" is hereinafter referred to as "target type". The type of the puzzle piece 22 situated at the start point of the selection path is set to be the target type. When a slide operation has been performed on a non-playable character piece 22n that belongs to a type other than the target type when designating the selection path, the selection of the non-playable character piece 22n is determined to be invalid, and only the preceding selection results are determined to be valid.

The selection path is displayed on the board 20 using a path line 7.

The display state (e.g., type and thickness) of the path line 7 is changed corresponding to the selection path designation state. More specifically, the type of path line 7 is determined corresponding to the character attribute (e.g., attack type) of the player character 4 set to be the attacker, and the target type, and represents the type of attack to be performed by the player character 4. The thickness of the path line 7 is determined based on the number of non-playable character pieces 22n that lie in the selection path (i.e., attack capability). In one embodiment of the invention, the thickness of the path line 7 is increased stepwise or continuously as the attack capability increases.

The player removes the finger from the touch panel 1506 after sliding the finger, or slides the finger to a non-playable character piece 22n that belong to a type other than the target type, to complete the designation of the selection path (see FIG. 4 (see (3))). In the latter case, the path up to the puzzle piece 22 that has been selected before the finger is slid to the non-playable character piece 22n that belong to a type other than the target type, is determined to be the selection path.

When the number of puzzle pieces 22 that lie in the selection path has not reached the given number (e.g., 3) when the player has completed the designation of the selection path, it is determined that a deletion condition has not been satisfied, and the puzzle piece 22 that lies in the selection path is not deleted. Specifically, it is determined that the player has failed to designate a group of puzzle pieces 22 (i.e., failed to solve the puzzle).

FIG. 4 illustrates an example in which the player has input the selection path by touching the player character 4e, sliding the finger to the cross-hatched hexagonal non-playable character piece 22n that is situated opposite to the player character 4e, sliding the finger in the upward direction so as to pass through two cross-hatched hexagonal non-playable character pieces 22n, sliding the finger in the leftward direction so as to pass through one cross-hatched hexagonal non-playable character piece 22n, sliding the finger to the enemy character piece 22e situated at the center of the board 20, and then removing the finger.

Since the puzzle pieces 22 that lie in the selection path include only the cross-hatched hexagonal non-playable character pieces 22n, and the enemy character piece 22e that is considered to belong to a type that is identical to that of the cross-hatched hexagonal non-playable character pieces 22n, only character pieces that belong to the target type, or are considered to belong to the target type, lie in the selection path. Specifically, the path designation rules with regard to the type of puzzle piece is met. Since the number of puzzle pieces 22 that lie in the selection path is equal to or larger than the given number (i.e., 4 (non-playable character pieces 22n)+1 (enemy character piece 22e)=5), the designation of the selection path is determined to be valid. Therefore, it is determined that the player has performed an operation input so that the player character 4e attacks the enemy character piece 22e situated at the center of the board 20 with the attack capability based on four non-playable character pieces 22n.

Even if the player has not removed the finger at the enemy character piece 22e situated at the center of the board 20, and slid the finger to another non-playable character piece 22n that is situated adjacent to the enemy character piece 22e in the upward, downward, or leftward direction, the designation (designation operation input) of the selection path is stopped since the non-playable character pieces 22n situated adjacent to the enemy character piece 22e in the upward, downward, or leftward direction do not belong to the target type.

The designation (designation operation input) of the selection path is automatically stopped when a given time limit has been reached after the start of the selection path designation operation.

Note that the connection-permitted direction may be appropriately set corresponding to the shape of the piece placement frame of the board 20. When the piece placement frame has a rectangular shape, the connection-permitted direction may be set to include four directions that correspond to an angle of 45°, 135°, 225°, or 315° (counterclockwise) with respect to the rightward direction in addition to the vertical direction and the horizontal direction.

When the player has failed to meet the path designation rules when designating the selection path (e.g., when the player has selected a cross-hatched hexagonal non-playable character piece 22n, and then selected a non-playable character piece 22n that belong to another type), the designation of the selection path is stopped in a state immediately before the player fails to meet the path designation rules. The player can continue to designate the selection path from the preceding position as long as the player does not remove the finger from the touch panel 1506.

The enemy character piece 22e may be considered to correspond to all of the four basic non-playable character pieces 22n. Therefore, the path designation rules is met even when the enemy character piece 22e is situated at a position opposite to the player character 4 hat has been set to be the attacker, or another enemy character piece 22e is situated (on the selection path) adjacent to the enemy character piece 22e that is situated at a position opposite to the player character 4 hat has been set to be the attacker.

Figure 5:
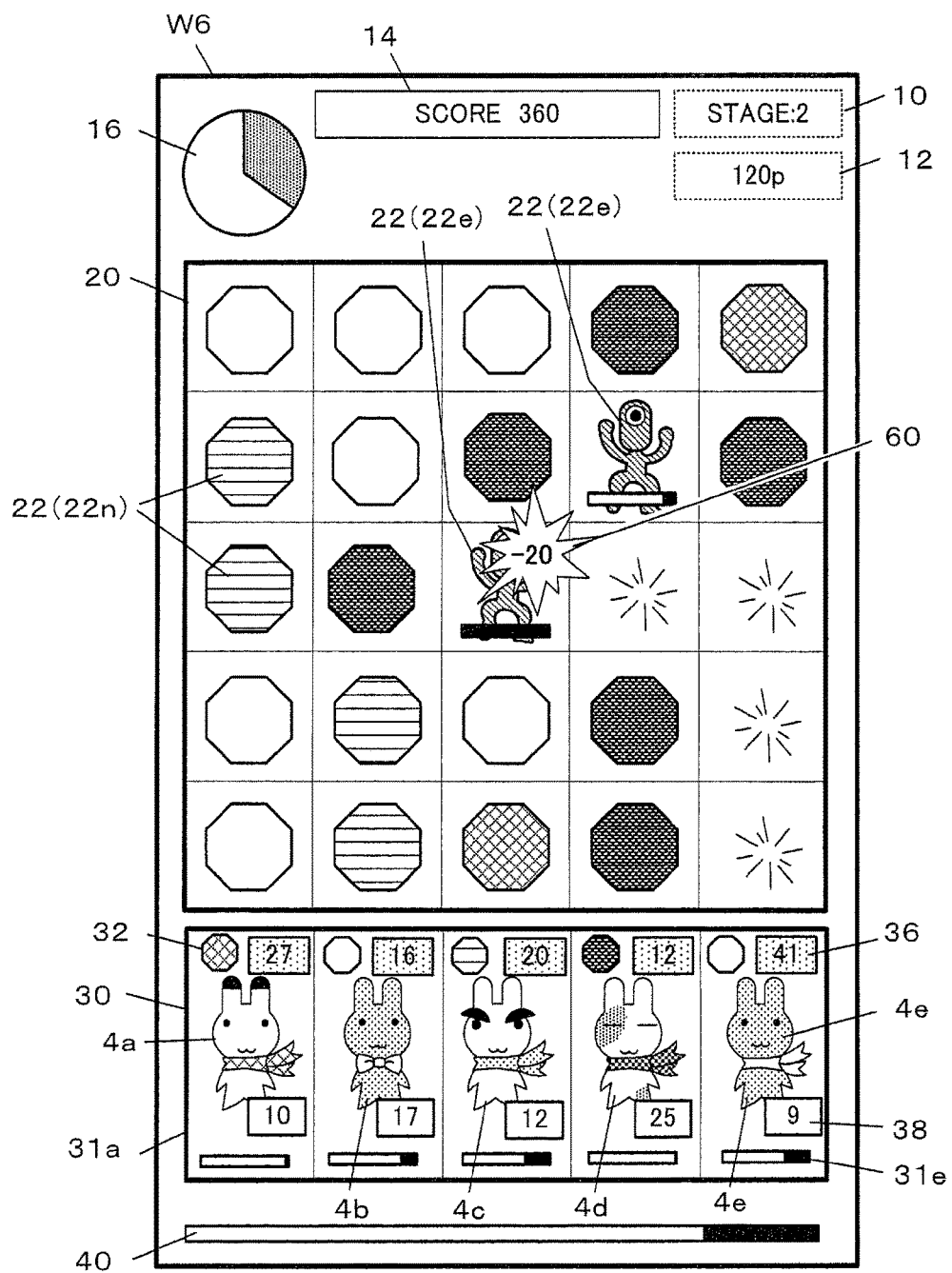
FIG. 5 is a view illustrating an example of a game screen that displays an attack effect.

FIG. 5 is a view illustrating an example of a game screen that displays an attack effect.

When the player has completed the designation of the selection path, the non-playable character pieces 22n that lie in the selection path are deleted from the board 20. When the enemy character piece 22e lies in the selection path, an attack effect that represents that the player character 4 set to be the attacker has attacked the enemy character piece 22e is displayed within the game screen.

In the example of the selection path illustrated in FIG. 4, the attribute of the player character 4e set to be the start point (attacker) is "white", and the target type of the selection path is "horizontal stripes". Therefore, it is determined that the type of non-playable character piece 22n does not coincide with the character attribute of the player character 4 set to be the start point (attacker) of the selection path (i.e., the target type differs from the character attribute). In this case, a normal attack effect 60 is displayed with respect to the attack target enemy character piece 22e.

The amount of damage to the attack target enemy character is calculated, and the life points are decremented corresponding to the amount of damage. The amount of damage to the enemy character piece 22e is determined based on the attack capability parameter value of the player character 4 set to be the attacker, and the defense capability parameter value of the attack target enemy character piece 22e. For example, the amount of damage to the enemy character piece 22e is determined based on a given function or table data calculated in advance. The player character 4 having a higher character level has a higher attack capability, and the attack capability of the player character 4 increases as the number of deletion target non-playable character pieces 22n increases. The attack capability of the player character 4 changes corresponding to whether or not the player has designated the enemy character piece 22e as the attack target when designating the selection path.

Figure 6:
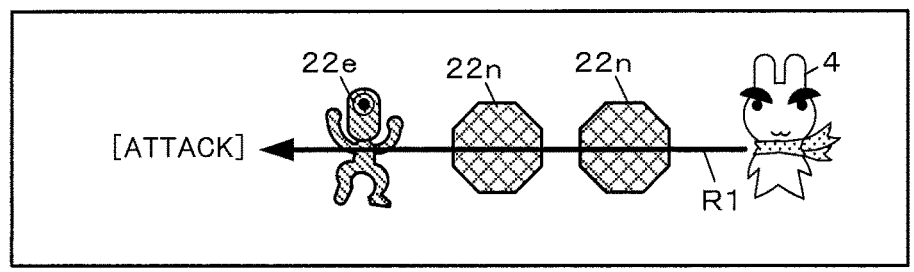
FIG. 6 is a view illustrating a difference in attack capability of a player character corresponding to designation of a selection path.
Figure 6:
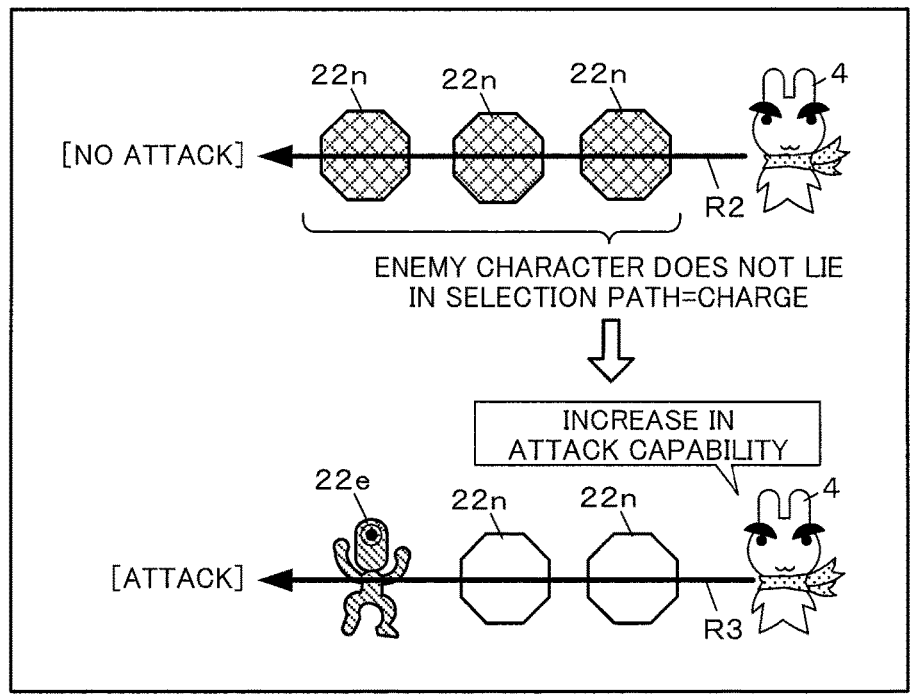

FIG. 6 is a view illustrating a difference in the attack capability of the player character 4 corresponding to the designation of the selection path.

When the enemy character piece 22e lies in the selection path (selection path R1) (see the leftward arrow), the player character 4 attacks the enemy character piece 22e upon completion of the designation of the selection path R1.

When the enemy character piece 22e does not lie in the selection path (see the selection path R2), the player character 4 does not attack the enemy character piece 22e. In the game according to one embodiment of the invention, the player character 4 is thus "charged" with respect to the attack capability. When the enemy character piece 22e lies in the next selection path R3, the number of non-playable character pieces 22n deleted as a result of designating the selection path R2 is added to the number of non-playable character pieces 22n that are deleted as a result of designating the selection path R3, and the attack capability is determined based on the number of non-playable character pieces 22n thus calculated. Specifically, it is possible to make a stronger attack by charging the player character 4 with respect to the attack capability by designating the selection path R2 so that the enemy character piece 22e does not lie in the selection path R2, and designating the next selection path R3 so that the enemy character piece 22e lies in the selection path R3. Note that the number of times that the selection path can be designated so that the enemy character piece 22e does not lie in the selection path is not limited. Specifically, the player can make a stronger attack by repeatedly designating the selection path so that the enemy character piece 22e does not lie in the selection path. Note that the upper limit may be appropriately set to the number of times that the selection path can be designated so that the enemy character piece 22e does not lie in the selection path.

Figure 7:
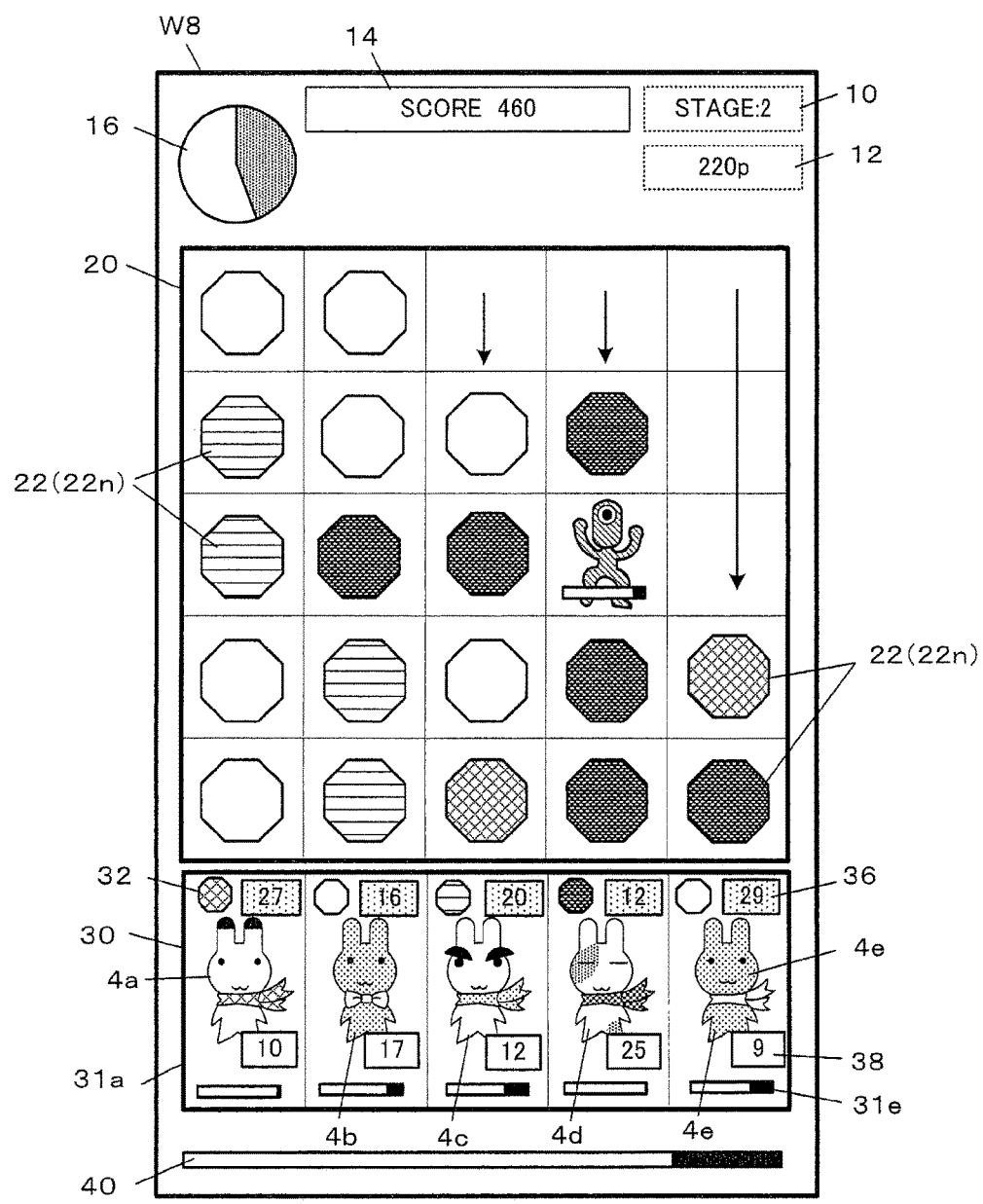
FIG. 7 is a view illustrating an example of a game screen after completion of an attack effect.

FIG. 7 is a view illustrating an example of a game screen that is displayed after completion of the attack effect. FIG. 7 illustrates an example of a change in game screen after the non-playable character pieces 22n and the enemy character piece 22e that lie in the selection path have been deleted (see FIG. 5).

When the life points of the enemy character piece 22e have not reached "0" after the life points of the enemy character piece 22e have been decremented due to the attack by the player character 4, the enemy character piece 22e remains on the board 20. The enemy character piece 22e is deleted from the board 20 when the life points of the enemy character piece 22e have reached "0". Game points are assigned to the player based on the amount of damage to the enemy character pieces 22e, and the number of puzzle pieces 22 that have been deleted.

The piece placement frames from which the enemy character piece 22e or the non-playable character piece 22n has been deleted, become empty. In this case, the remaining puzzle pieces 22 are automatically moved in a given direction so as to be placed in the empty piece placement frames (see FIG. 7), and additional puzzle pieces 22 are placed in the piece placement frames that have become empty due to the movement of the remaining puzzle pieces 22.

Figure 8:
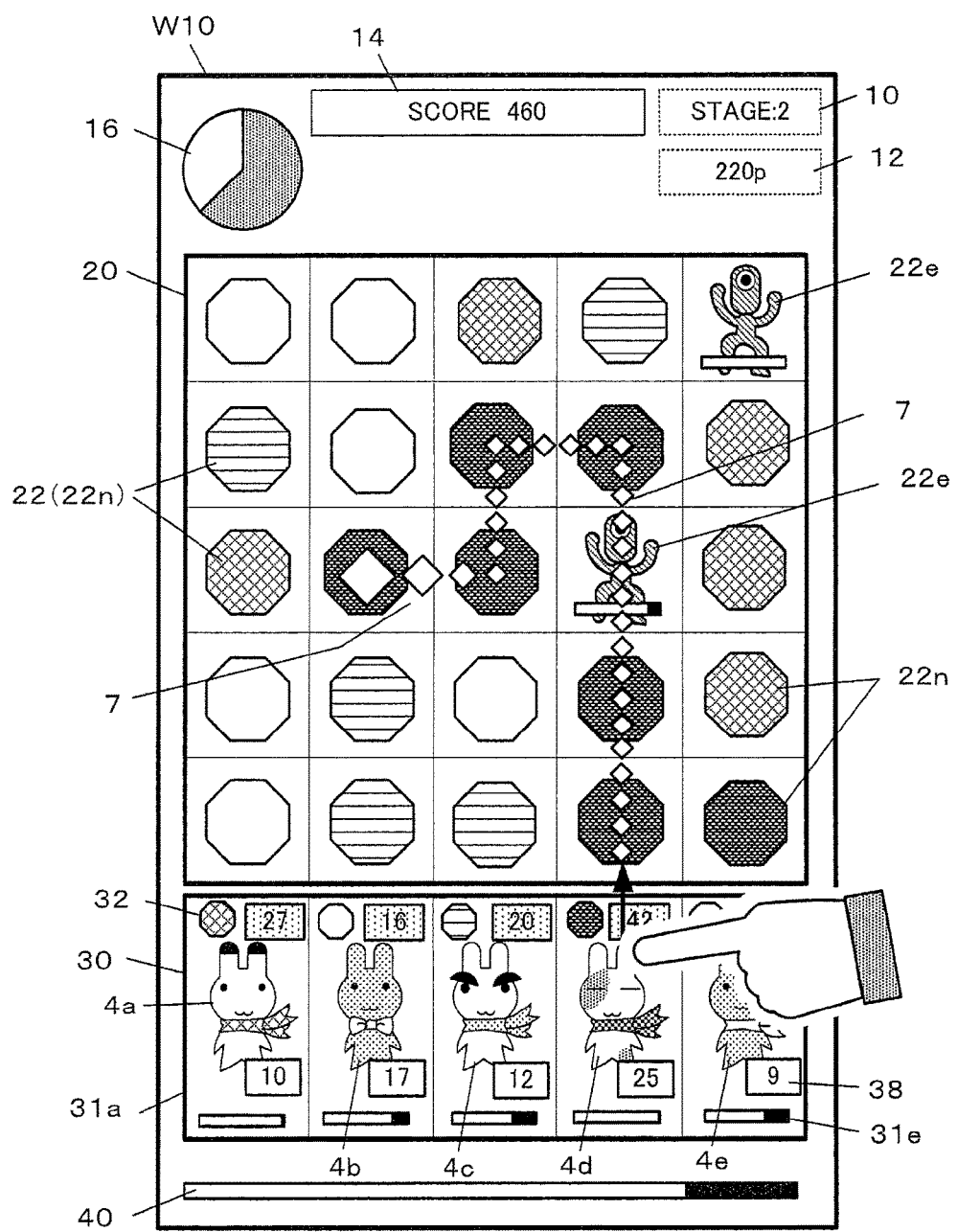
FIG. 8 is a view illustrating an example of a game screen in a state in which additional puzzle pieces have been placed, and a player has designated (input) another selection path.

FIG. 8 is a view illustrating an example of a game screen in a state in which additional puzzle pieces 22 have been placed in the empty piece placement frames (see FIG. 7), and the player has designated (input) another selection path.

An example in which the player has designated (input) a special selection path is described below. As illustrated in FIG. 8, when the player has designated the selection path so that the character attribute of the player character 4d set to be the attacker coincides with the type of non-playable character pieces 22n that lie in the selection path (i.e., the character attribute is identical to (or considered to be identical to) the target type), a special attack effect is displayed instead of the normal attack effect. When the number of non-playable character pieces 22n that lie in the selection path has satisfied a given condition (e.g., when 5 or more non-playable character pieces 22n lie in the selection path) (see FIG. 8), a free non-playable character piece appears in the selection path.

Figure 9:
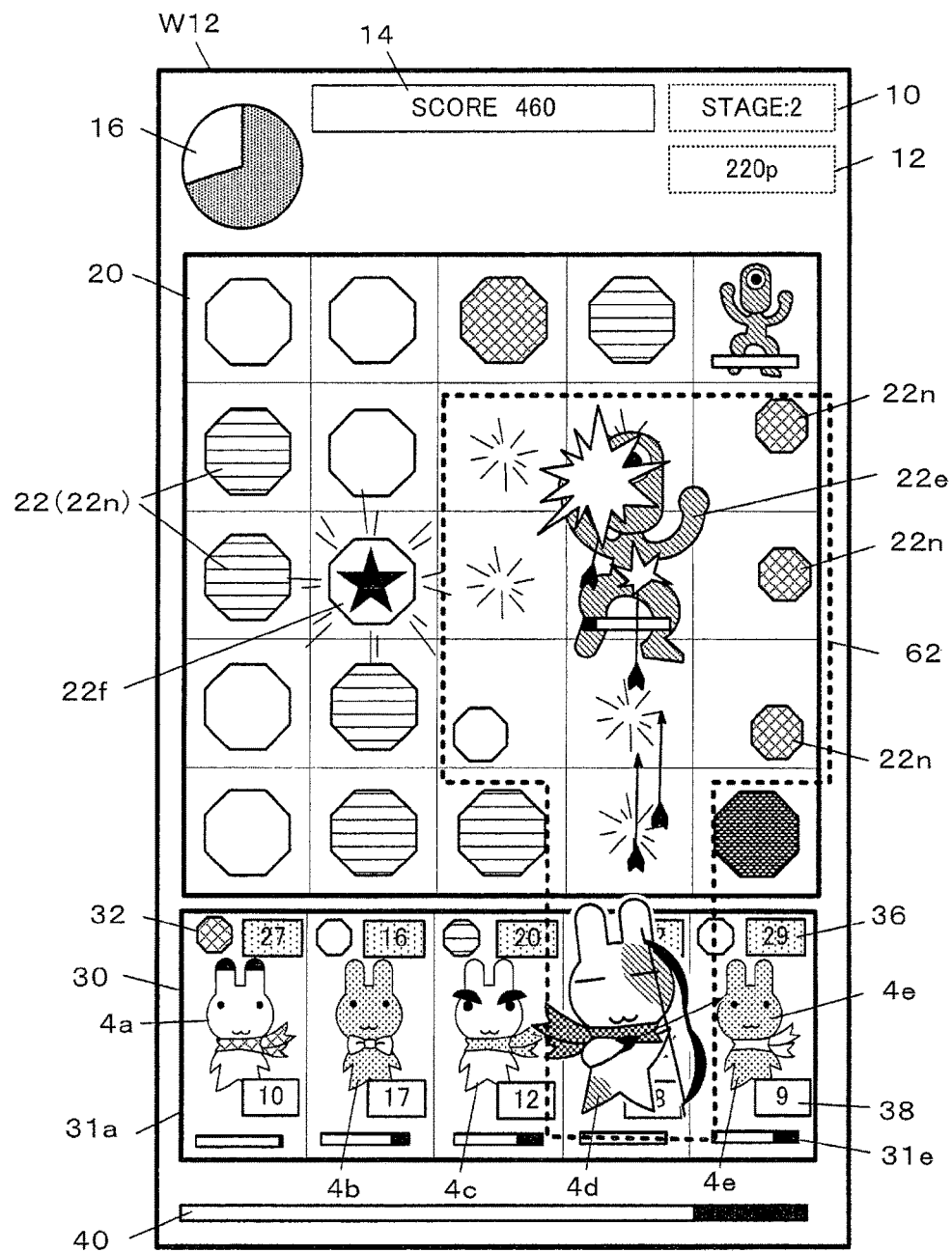
FIG. 9 is a view illustrating an example of an attack effect display.

FIG. 9 is a view illustrating an example of the attack effect that is displayed within the game screen after completion of the designation of the selection path (see FIG. 8). FIG. 9 illustrates an example of the special attack effect when the type of non-playable character pieces 22n that lie in the selection path coincides with the character attribute of the player character 4 set to be the start point (attacker) of the selection path. FIG. 9 also illustrates an example of the addition of the free non-playable character piece.

The special attack effect is described below.

A special attack effect 62 is implemented so that the non-playable character pieces 22n that lie in the selection path are deleted, and the puzzle pieces 22 situated around the attack target enemy character piece 22e are reduced in size, and moved away from the attack target enemy character piece 22e such that a space is formed around the attack target enemy character piece 22e. The attack target enemy character piece 22e is displayed in an enlarged state (as compared with a normal state) within the space, and the player character 4d set to be the attacker is also displayed in an enlarged state (as compared with a normal state). A state in which the player character 4d attacks the attack target enemy character piece 22e is then displayed in a more detailed (richer) manner as compared with the normal attack effect. When the special attack effect has been completed, the display size of each puzzle piece 22 that has been reduced in size is returned to the original display size, and each puzzle piece 22 is displayed at a given position within the piece placement frame.

The free non-playable character piece is described below.

It is determined that a given implementation condition has been satisfied (i.e., a given free piece appearance condition has been satisfied) when the number of non-playable character pieces 22n that have been deleted has reached a given reference value, and the free piece 22f is placed at the end of the selection path, or a position determined at random, immediately after the non-playable character pieces 22n lying in the selection path have been deleted. After the free piece 22f has been placed, the remaining non-playable character pieces 22n are moved downward, and placed in the empty piece placement frames.

The free piece 22f is a puzzle piece that is considered to belong to the same type as that of each basic non-playable character piece 22n. According to the path designation rules, the free piece 22f is determined to belong to the same type as that of each basic non-playable character piece 22n in the same manner as the enemy character piece 22e. When the selection path has been designated so that the free piece 22f lies in the selection path, the target type that has been set with respect to the selection path is reset.

Figure 10:
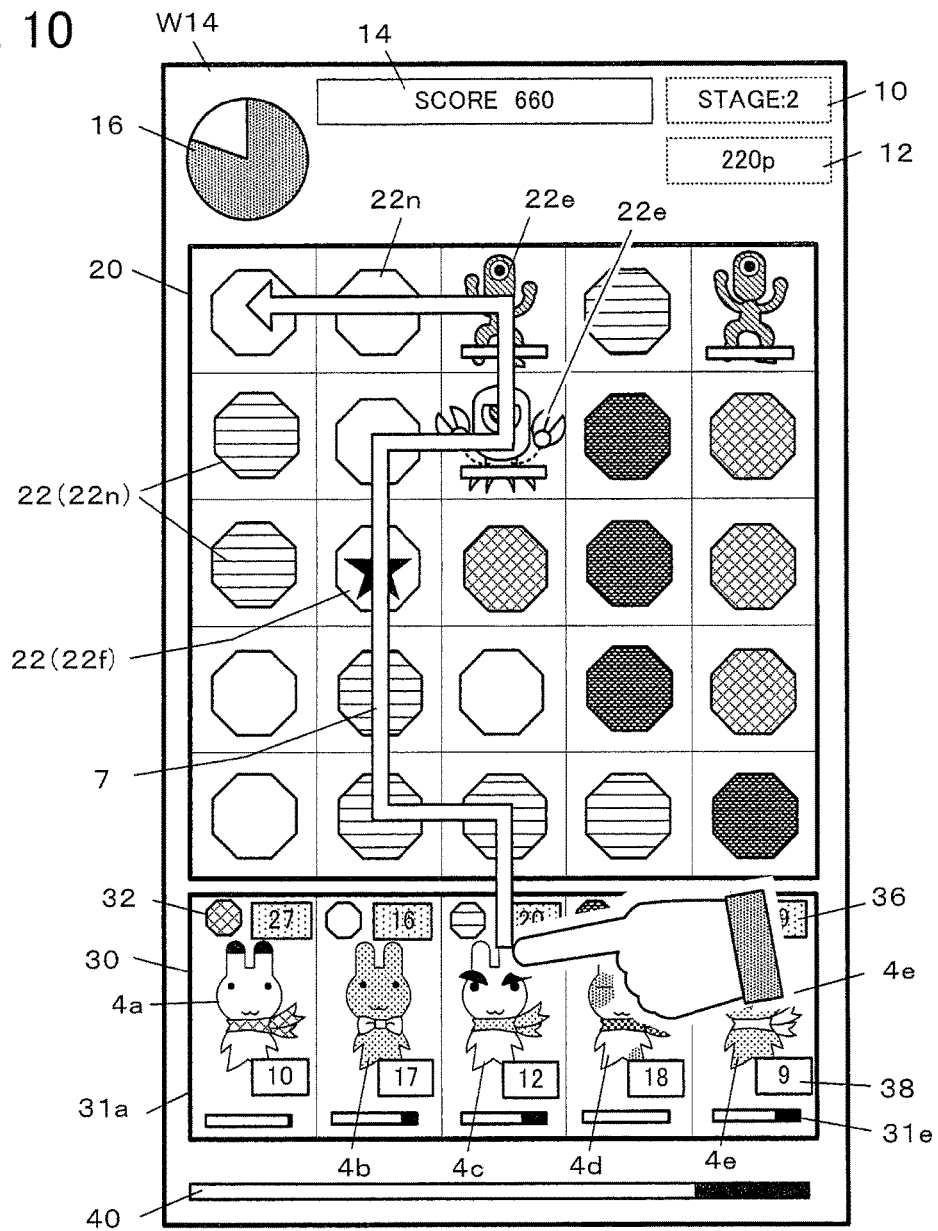
FIG. 10 is a view illustrating an example of a game screen when a selection path including a free piece is designated.
Figure 10:
Figure 10:
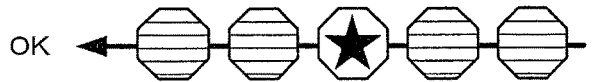
Figure 10:

FIG. 10 is a view illustrating an example of a game screen when the selection path is selected so that the free piece 22f lies in the selection path. In the example illustrated in FIG. 10, the player touches the player character 4c with a finger, and slides the finger to the horizontal-striped hexagonal non-playable character piece 22n that is situated opposite to the player character 4c. The target type is thus set to "horizontal stripes". Therefore, the player can extend the selection path by sliding the finger so as to sequentially select horizontal-striped hexagonal non-playable character pieces 22n.

The player slides the finger to the free piece 22f after selecting the third puzzle piece 22. The target type is thus set to "unspecified". The target type is updated (set) thereafter corresponding to the type of selected non-playable character piece 22n. Specifically, the player can extend the selection path by sliding the finger to a non-playable character piece 22n that belongs to a type other than the type "horizontal stripes", or the enemy character piece 22e. In the example illustrated in FIG. 10, the player slides the finger to the white hexagonal non-playable character piece 22n that is situated adjacent to the free piece 22f in the upward direction. The target type is thus set to "white". Therefore, the player can extend the selection path by sliding the finger to another white hexagonal non-playable character piece 22n or the enemy character piece 22e. Specifically, it is possible to designate a long selection path (that cannot be achieved by selecting only pieces that belong to the target type) by causing the free piece 22f to appear, and designating the selection path so that the free piece 22f lies in the selection path. In the example illustrated in FIG. 10, another free piece 22f will appear since the free piece appearance condition is satisfied.

An example in which it is impossible to solve the puzzle using the puzzle pieces 22 placed on the board 20 is described below.

Figure 11:
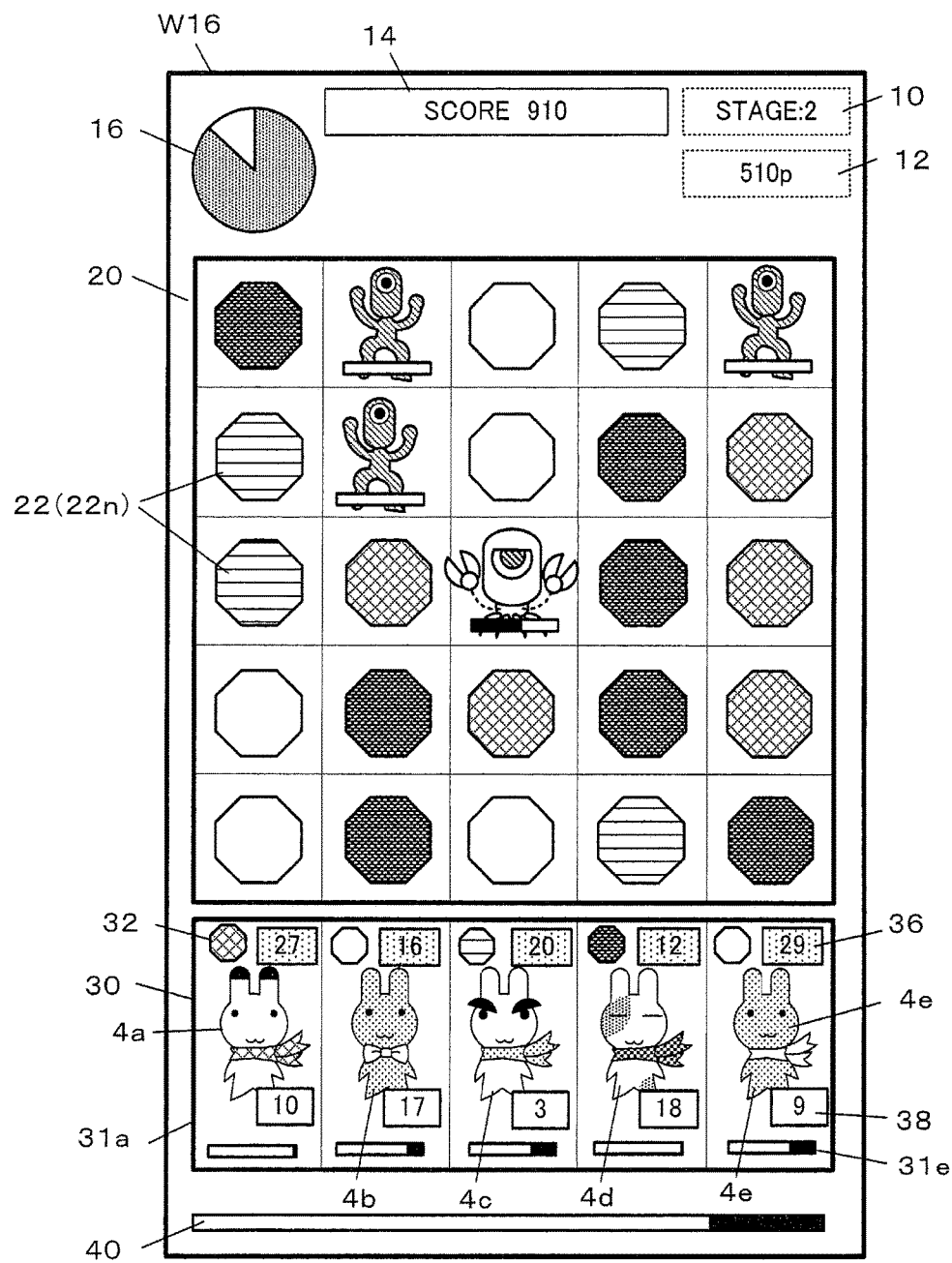
FIG. 11 is a view illustrating an example of a game screen in a special state (no-solution state).

In principle, a puzzle piece 22 is automatically placed in an empty piece placement frame. However, a situation may occur in which it is impossible to solve the puzzle (see FIG. 11). Specifically, when the player has set the desired player character 4 to be the attacker (i.e., the start point of the selection path), the player must select the puzzle piece 22 that is situated opposite to the player character 4 set to be the attacker, and designate the selection path by selecting puzzle pieces 22 that belong to the target type. In the example illustrated in FIG. 11, however, it is impossible to designate the selection path so that a given number of puzzle pieces 22 that belong to an identical type, or are considered to belong to an identical type, lie in the selection path, when each puzzle piece 22 situated opposite to the deck is selected. Specifically, it is impossible to solve the puzzle (i.e., a no-solution state has occurred).

Figure 12:
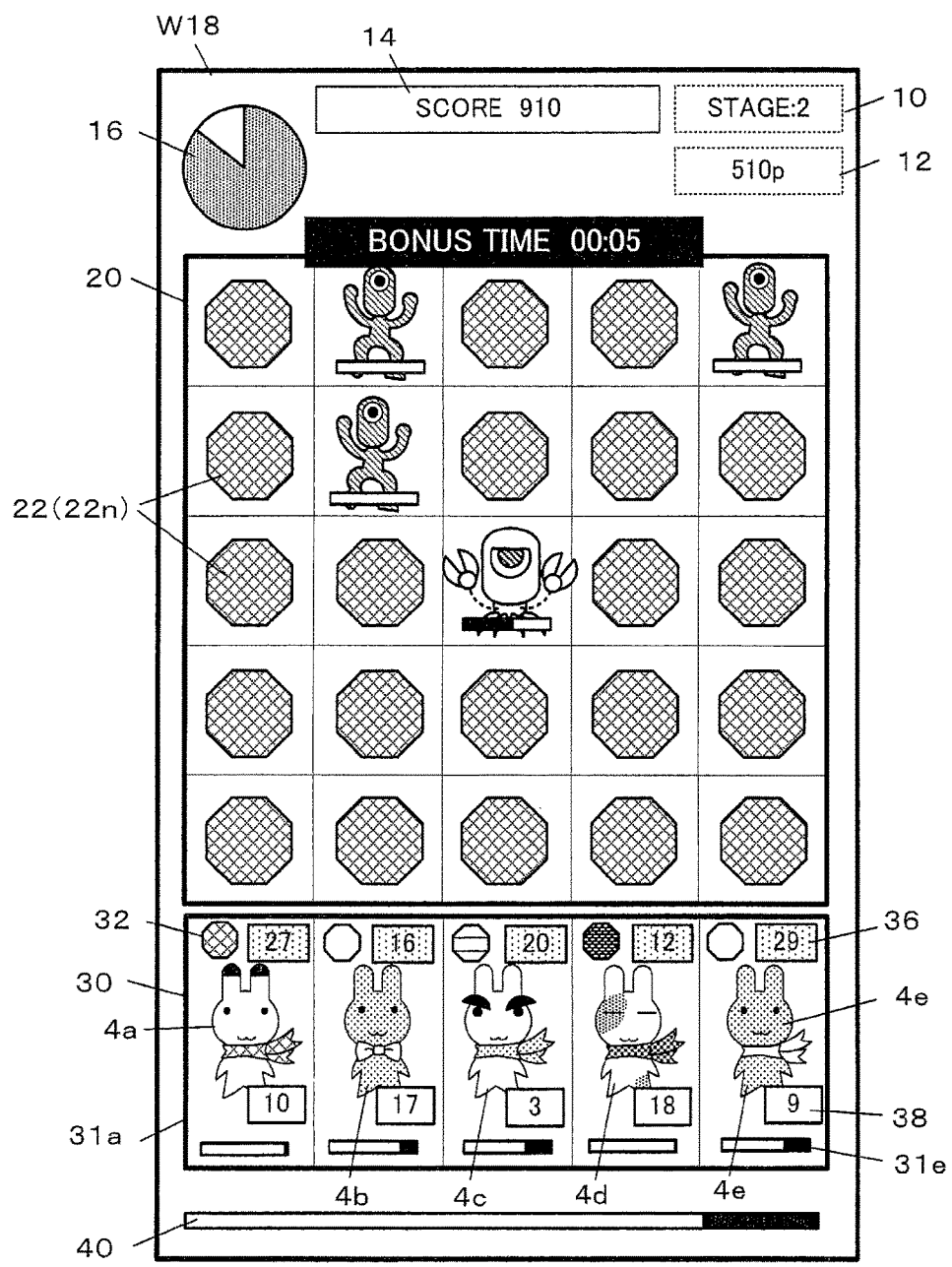
FIG. 12 is a view illustrating an example of a game screen showing an example of a method for coping with a special state (no-solution state).

FIG. 12 is a view illustrating an example of a game screen showing an example of a method for coping with such a special state (i.e., no-solution state).

In one embodiment of the invention, when a no-solution state has occurred, the types of non-playable character pieces 22n are changed for a given time to one type that has been select at random from the four basic types so that the puzzle can be necessarily solved. The player can arbitrarily designate (input) the selection path during the above period. Therefore, the player can solve the puzzle (i.e., get significant game points) during the player's turn by designating (inputting) an arbitrary selection path using arbitrary puzzle pieces 22. In other words, the no-solution state is canceled by providing a bonus time that is significantly advantageous to the player. Therefore, it is possible to allow the player to be more involved in the game while coping with the no-solution state.

When the bonus time has ended, the type of each non-playable character piece 22n is returned to the original type, and the remaining puzzle pieces 22 are moved to be placed in empty piece placement frames.

Functional Configuration

Figure 13:
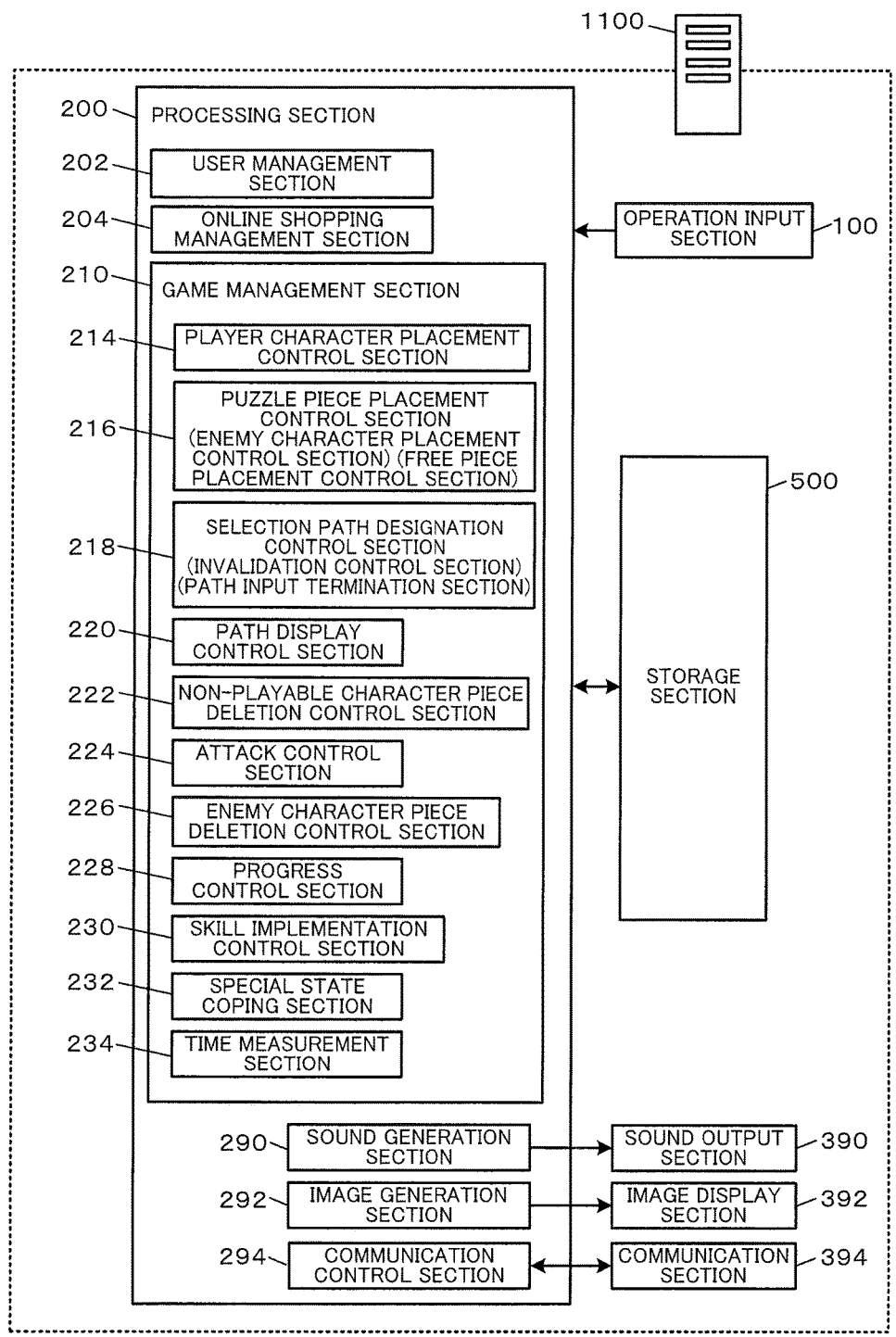
FIG. 13 is a functional block diagram illustrating a functional configuration example of a server system.

FIG. 13 is a functional block diagram illustrating a functional configuration example of the server system 1100 according to one embodiment of the invention. The server system 1100 according to one embodiment of the invention includes an operation input section 100, a processing section 200, a sound output section 390, an image display section 392, a communication section 394, and a storage section 500.

The operation input section 100 is a means for inputting an operation for managing the server system 1100. A keyboard and the like correspond to the operation input section 100.

The processing section 200 is implemented by electronic parts such as a microprocessor (e.g., CPU and GPU) and an IC memory. The processing section 200 performs a data input-output control process on each functional section including the operation input section 100 and the storage section 500. The processing section 200 performs various calculation processes based on a given program, data, an operation input signal from the operation input section 100, and data received from the player terminal 1500, and controls the operation of the server system 1100. The control board 1150 (see FIG. 1) corresponds to the processing section 200.

The processing section 200 according to one embodiment of the invention includes a user management section 202, an online shopping management section 204, a game management section 210, a sound generation section 290, an image generation section 292, and a communication control section 294. Note that the processing section 200 may optionally include an additional functional section.

The user management section 202 performs a user registration process, and a registration-management process that registers and manages various types of data linked to the registered user. For example, the user management section 202 may perform 1) a process that provides a specific user ID to the user who has performed a given registration process, 2) an electronic payment medium link process, 3) an electronic payment account setting process, and an account payment process using cash or a credit card, 4) a payment process (e.g., payment of a play fee), 5) a payment history storage-management process, and the like. When the game is configured so that the player character can be used in the game after registering the card ID of a game card (trading card), the user management section 202 may also perform a game card registration process.

The online shopping management section 204 is a functional section that allows the player to purchase the player character 4, an item that can be used in the game, a lottery right, and the like through online shopping. The online shopping may be implemented in the same manner as known online shopping.

The game management section 210 performs various game management processes according to one embodiment of the invention.

When implementing a client-server online game, the game management section 210 performs a control process that provides data required for game play to the player terminal 1500 while communicating with the player terminal 1500. For example, the game management section 210 may perform 1) a player log-in/log-out process, 2) a process that places an object (e.g., background) in a virtual three-dimensional space to form a game field, 3) a process that places the board 20, the deck 30, the puzzle piece 2 (that is placed on the board 20), the player character 4 (that is placed in the deck 30), and a virtual camera (that captures the board 20, the deck 30, the puzzle piece 2, and the player character 4) in the game field, 4) a process that automatically controls the virtual camera, 5) a process that controls the action of the player character 4 corresponding to an operation input performed using the player terminal 1500, 6) a process that controls an automatic attack on the enemy character piece 22e, 7) an attack effect-damage reflection process, 8) a game result calculation process, 9) time measurement process, and the like. The game management section 210 may store various types of data necessary for controlling game play in the storage section 500. The game according to one embodiment of the invention is basically performed in a single-player mode. When implementing the game in a player versus player (PvP) mode, the game management section 210 may perform a player matching control process.

The game management section 210 according to one embodiment of the invention includes a player character placement control section 214, a puzzle piece placement control section 216, a selection path designation control section 218, a path display control section 220, a non-playable character piece deletion control section 222, an attack control section 224, an enemy character piece deletion control section 226, a progress control section 228, a skill implementation control section 230, a special state coping section 232, and a time measurement section 234. Note that the game management section 210 may optionally include an additional element (section).

The player character placement control section 214 forms the deck 30 (see FIG. 3) corresponding to an operation input. Specifically, the player character placement control section 214 selects the player character 4 used in the game from a list of the available player characters registered by the player in advance corresponding to an operation input. The player character placement control section 214 then performs a placement control process that places the selected player character at the character placement position 31 that is situated opposite to a given position (given edge position) of the edge of the board 20. The player character placement control section 214 can change the placement position during the game (game play) corresponding to a given character placement position change operation input (e.g., an operation that slides the player character 4). Specifically, the player character placement control section 214 can change the relationship between the player character 4 and the given edge position of the board 20.

The puzzle piece placement control section 216 performs a management-control process on the puzzle piece 22 placed on the board 20 (see FIG. 3). In one embodiment of the invention, the puzzle piece placement control section 216 performs an enemy character piece placement control process that places the enemy character piece that represents the enemy character on the board 20. The puzzle piece placement control section 216 also performs a free piece placement control process that causes the free piece 22$f$ (see FIG. 9) to appear in the selection path based on at least the non-playable character piece 22$n$ that has been deleted due to a selection path designation operation input.

The selection path designation control section 218 performs a control process with regard to a selection path designation operation input.

In one embodiment of the invention, the selection path designation control section 218 performs an invalidation control process the invalidates a selection path designation operation input that does not start from the given edge position that is situated at the edge of the board 20 opposite to the character placement position 31 of the deck 30 (see FIG. 3), or the character placement position 31.

The selection path designation control section 218 may perform a path input termination control process that, when the puzzle pieces 22 that have been sequentially selected do not satisfy a given connection condition with respect to the type (e.g., a condition whereby the puzzle pieces 22 belong to an identical type, or are considered to belong to an identical type), determines that the selection path has ended up to the puzzle piece 22 that has been selected in a state in which the connection condition is satisfied, and terminates the path designation (selection) input.

The path display control section 220 performs a display control process on the path line 7 (see FIG. 4).

Specifically, the path display control section 220 performs the display control process that changes the display state of the path line 7 using the number of non-playable character pieces 22$n$ that are deleted due to the selection path designation operation input, and/or the type of player character 4 placed at a position that corresponds to the start point of the selection path (i.e., the character placement position 31 situated opposite to the placement position of the puzzle piece 22 (selection order: "1") set to be the start point of the selection path). When the enemy character piece 22$e$ lies in the path represented by the path line 7 that is subjected to the display control process, the path display control section 220 may change the display state of the path line 7 corresponding to the attack that is implemented by the player character 4 set to be the attacker. In one embodiment of the invention, since the attack that is implemented by the player character 4 set to be the attacker depends on the character attribute, the display state is changed substantially corresponding to the character attribute of the player character 4 set to be the attacker. When a special attack can be implemented using an item, for example, the display state may be changed using the type of item.

The non-playable character piece deletion control section 222 performs a control process that deletes the non-playable character piece 22$n$ that has satisfied a given deletion condition from the board 20.

The attack control section 224 controls an attack that is implemented by the player character 4 on the enemy character piece 22$e$. Specifically, when the enemy character piece 22$e$ lies in the selection path, the attack control section 224 calculates the attack capability using 1) the number N of non-playable character pieces 22$n$ deleted due to the selection path designation operation input, 2) the parameter value (e.g., character level L (where L is a natural number)) of the player character 4 set to be the attacker that is placed at a position that corresponds to the start point of the selection path (i.e., the character placement position 31 that corresponds to the puzzle piece 22 (selection order: "1") set to be the start point of the selection path), 3) a compatibility value M (where M is a natural number) between the character attribute 532 of the player character 4 set to be the attacker and the non-playable character pieces 22$n$ that have been deleted, and 4) the number C (where C is a natural number) of successive attacks during the current player's turn, and changes the parameter value of the enemy character piece 22$e$ that lies in the selection path so that the enemy character piece 22$e$ is damaged based on the calculated attack capability.

The attack control section 224 may perform a display control process that implements the special attack effect 62 (see FIG. 9) that displays the state of the attack while highlighting the player character 4 set to be the attacker, and the attack target enemy character piece 22$e$.

The enemy character piece deletion control section 226 controls deletion of the enemy character piece 22$e$ based on the parameter value of the enemy character piece 22$e$.

The progress control section 228 controls the progress of the puzzle game while switching between the player's turn and the enemy's turn. Specifically, the progress control section 228 determines a period until a given time elapses after a selection path designation operation input has been performed to be the player's turn.

The skill implementation control section 230 controls the implementation of the skill by each player character 4.

Specifically, the skill implementation control section 230 counts the number N of non-playable character pieces 22$n$ deleted due to the selection path designation operation input corresponding to each player character 4 (set to be the attacker) placed at a position that corresponds to the start point of the selection path, and causes the player character 4 for which the number N has satisfied a given skill implementation threshold value condition to implement a given skill.

The special state coping section 232 detects a given special state (no-solution state) in which the puzzle pieces 22 placed on the board 20 cannot be deleted due to a selection path designation operation input, and changes the types of non-playable character pieces 22n placed on the board 20 (except for a given type (enemy character piece 22e)) to a specific type. The special state coping section 232 changes the type of each non-playable character piece 22n to the original type when a given time has elapsed.

The time measurement section 234 performs a time measurement process that measures the current date/time, and controls a timer, for example.

The sound generation section 290 is implemented by a processor (e.g., digital signal processor (DSP) and sound synthesis IC), an audio codec that can reproduce a sound file, or the like. The sound generation section 290 generates data for the player terminal 1500 to reproduce a game background music (BGM) and a game effect sound. In one embodiment of the invention, the sound generation section 290 generates a sound signal necessary for a system management process, and outputs the sound signal to the sound output section 390. The sound output section 390 is implemented by a speaker or the like that outputs sound based on the sound signal output from the sound generation section 290.

The image generation section 292 is implemented by a processor (e.g., GPU and digital signal processor (DSP)), a video signal IC, a program (e.g., video codec), a drawing frame IC memory (e.g., frame buffer), or the like. The image generation section 292 generates data for the player terminal 1500 to display a game screen (image) based on the processing results of the game management section 210. In one embodiment of the invention, the image generation section 292 generates an image necessary for a system management process, and outputs the resulting image signal to the image display section 392.

The image display section 392 displays various images necessary for a system management process based on the image signal input from the image generation section 292. The image display section 392 may be implemented by an image display device such as a flat panel display, a cathode-ray tube (CRT), a projector, or a head-mounted display.

The communication control section 294 performs a data communication process, and exchanges data with an external device through the communication section 394.

The communication section 394 connects to the communication line 9 to implement communication. The communication section 394 is implemented by a transceiver, a modem, a terminal adapter (TA), a jack for a communication cable, a control circuit, or the like. The communication device 1153 (see FIG. 1) corresponds to the communication section 394.

The storage section 500 stores a program, various types of data, and the like that cause the processing section 200 to implement various functions. The storage section 500 is used as a work area for the processing section 200, and temporarily stores the results of calculations performed by the processing section 200 according to various programs, for example. The function of the storage section 500 is implemented by an IC memory (e.g., RAM and ROM), a magnetic disk (e.g., hard disk), an optical disk (e.g., CD-ROM and DVD), an online storage, or the like. The IC memory 1152 and the storage 1140 (see FIG. 1) correspond to the storage section 500.

Figure 14:
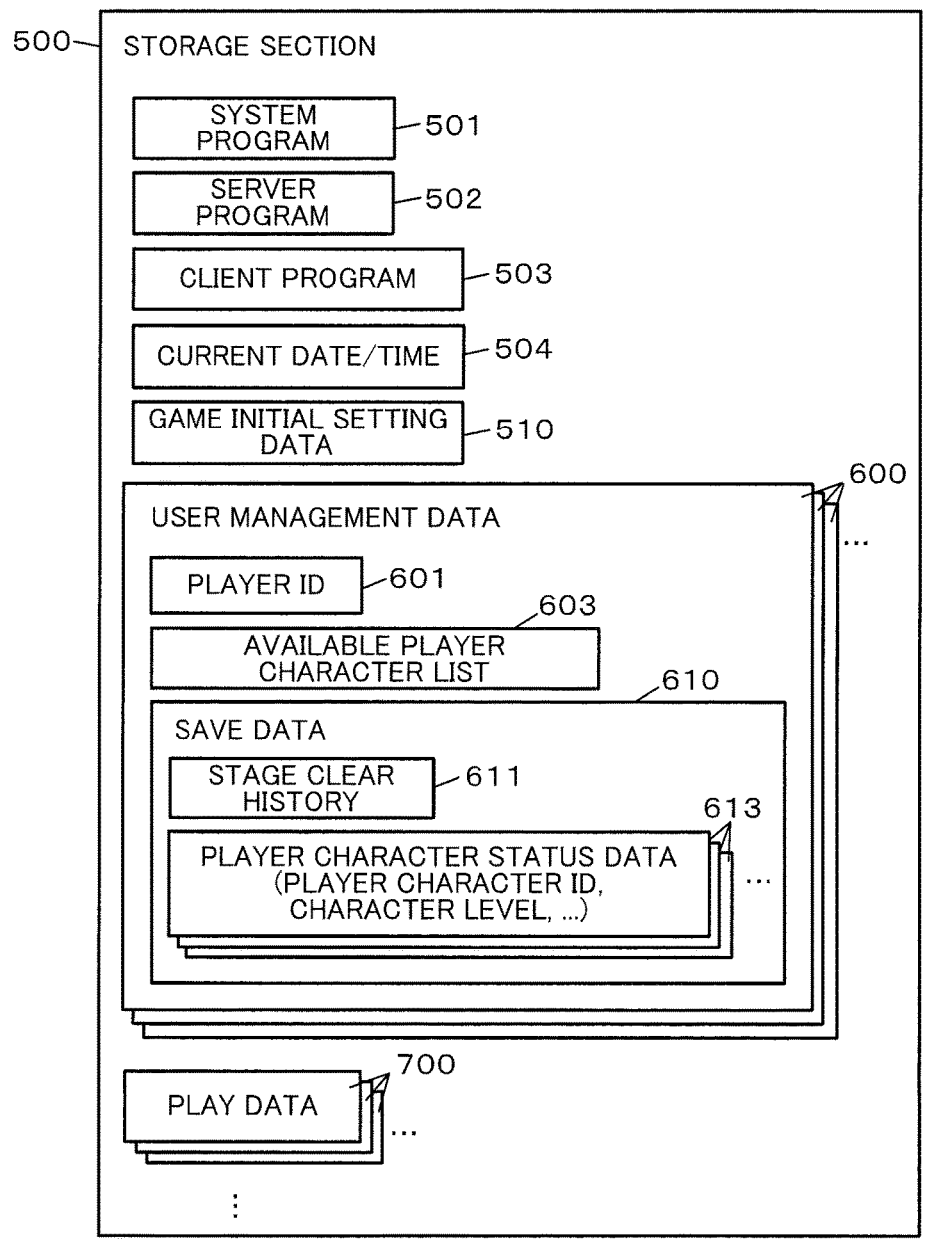
FIG. 14 is a view illustrating an example of a program and data that are stored in a storage section included in a server system.

FIG. 14 is a view illustrating an example of a program and data that are stored in the storage section 500 of the server system 1100 according to one embodiment of the invention. The storage section 500 stores a system program 501, a server program 502, a client program 503, a current date/time 504, game initial setting data 510, user management data 600, and play data 700. The storage section 500 may also appropriately store additional information (e.g., timer value, counter value, and flag).

The system program 501 is a basic program that is read and executed by the processing section 200 to implement a basic input-output function of a computer.

The server program 502 is a program that causes the processing section 200 to function as the user management section 202, the online shopping management section 204, and the game management section 210.

The client program 503 is a program that is executed by the player terminal 1500, and causes the player terminal 1500 to execute the game. The client program 503 may be implemented by a dedicated program, for example. When implementing the game according to one embodiment of the invention as a web game, the client program 503 may be implemented using web technology that actively controls screen display based on a web browser utilizing HTML, Java (registered trademark), Cascading Style Sheets (CSS), and the like, and a plug-in such as Adobe (registered trademark) Flash.

Note that another method may also be used.

The game initial setting data 510 includes various types of initial setting data necessary for implementing the game according to one embodiment of the invention that is provided by the server system 1100. Part of the game initial setting data may be distributed to the player terminal 1500.

Figure 15:
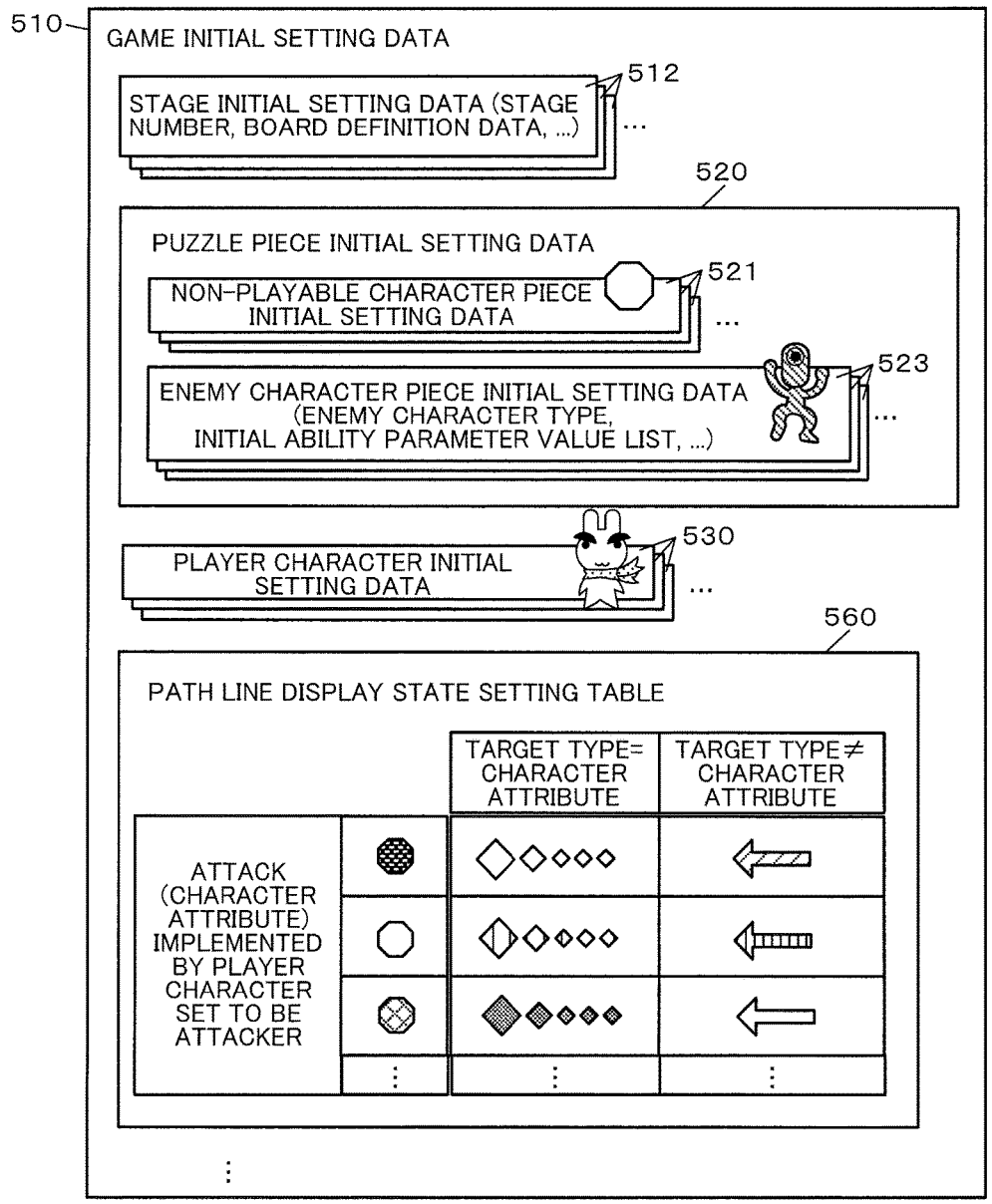
FIG. 15 is a view illustrating a data configuration example of game initial setting data.

FIG. 15 is a view illustrating a data configuration example of the game initial setting data 510 according to one embodiment of the invention. The game initial setting data 510 includes stage initial setting data 512, puzzle piece initial setting data 520, player character initial setting data 530, and a path line display state setting table 560. Note that the game initial setting data 510 may optionally include additional data.

The stage initial setting data 512 is provided corresponding to each stage that can be played during the game according to one embodiment of the invention. The stage initial setting data 512 includes a specific stage number, board definition data that defines the shape of the board 20, the type and the number of enemy character pieces 22e that appear in the stage, and data that represents a stage clear condition. The board definition data appropriately includes the shape of the piece placement frame included in the board 20, the number of piece placement frames, the position relationship between the piece placement frames, and the like.

The puzzle piece initial setting data 520 is provided corresponding to each type of puzzle piece 22.

In one embodiment of the invention, the puzzle piece initial setting data 520 includes non-playable character piece initial setting data 521 and enemy character piece initial setting data 523.

The non-playable character piece initial setting data 521 is provided corresponding to each type of non-playable character piece 22n. The non-playable character piece initial setting data 521 is data for displaying the puzzle piece 22 within the game screen. In one embodiment of the invention, the non-playable character piece initial setting data 521 is provided corresponding to the four basic non-playable character pieces including a white hexagonal non-playable character piece, a horizontal-striped hexagonal non-playable character piece, a cross-hatched hexagonal non-playable character piece, and a densely-hatched hexagonal non-playable character piece, and the free piece 22f.

The enemy character piece initial setting data 523 is provided corresponding to each type of enemy character piece 22e that appears in the stage. The enemy character piece initial setting data 523 includes a specific enemy character type, an ability parameter value list, and display data for displaying the enemy character within the game screen. Note that the enemy character piece initial setting data 523 may optionally include additional data.

Figure 16:
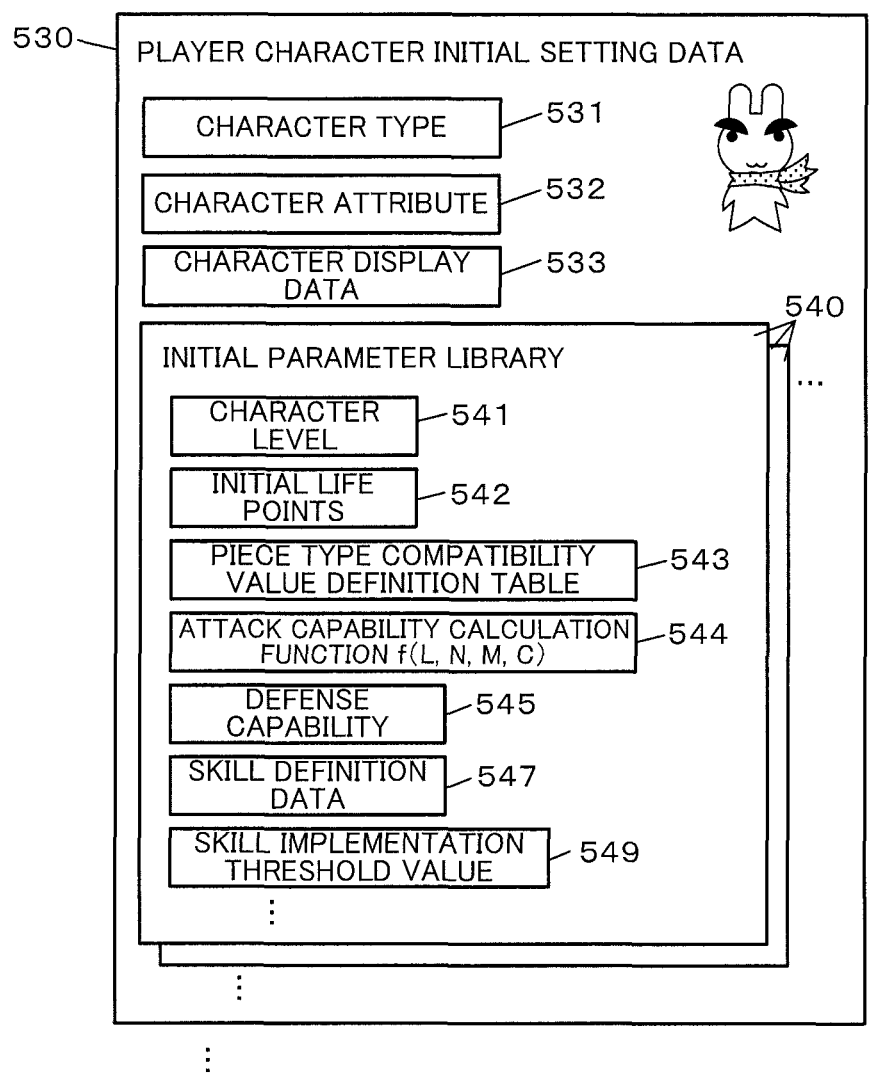
FIG. 16 is a view illustrating a data configuration example of player character initial setting data.

The player character initial setting data 530 is provided corresponding to each type of player character 4. As illustrated in FIG. 16, the player character initial setting data 530 includes a specific character type 531, a character attribute 532, character display data 533, and a initial parameter library 540. Note that the player character initial setting data 530 may optionally include additional data.

The initial parameter library 540 includes setting data that includes various initial settings with regard to the ability and the like of the player character. The initial parameter library 540 is provided corresponding to each character level 541. The initial parameter library 540 includes initial life points 542, a piece type compatibility value definition table 543, an attack capability calculation function 544, a defense capability 545, skill definition data 547, and a skill implementation threshold value 549 when the character level 541 is set to an initial state. Note that the initial parameter library 540 may optionally include additional data.

The piece type compatibility value definition table 543 defines the compatibility value M between the character attribute 532 of the player character 4 and the type of non-playable character piece 22n. In one embodiment of the invention, the compatibility value M is defined to be largest when the character attribute 532 and the type of non-playable character piece 22n are identical to each other.

The attack capability calculation function 544 is a function for calculating the attack capability of the player character 4. The attack capability calculation function 544 is a function that uses (as variables) the character level L (where L is a natural number) of the player character 4, the number N of non-playable character pieces 22n deleted due to the designation of the selection path, the compatibility value M (where M is a natural number) between the character attribute 532 and the non-playable character pieces 22n, and the number C of successive attacks during the current player's turn. In one embodiment of the invention, the attack capability calculation function 544 is set so that a higher attack capability is obtained as the character level L, the number N, the compatibility value M, and the number C increase.

The skill definition data 547 defines the details of the skill that is set to the player character 4.

The skill implementation threshold value 549 defines a condition that must be satisfied in order to implement the skill. In one embodiment of the invention, the skill implementation threshold value 549 defines a threshold value with respect to the total number (integrated value) of non-playable character pieces 22n that are deleted due to the designation of the selection path. Note that another condition may be set appropriately.

Again referring to FIG. 15, the path line display state setting table 560 defines the display state of the path line that represents (displays) the selection path. In one embodiment of the invention, the type of path line is defined corresponding to a combination of the character attribute (e.g., the type of attack) of the player character 4 set to be the attacker, and the target type. The thickness of the path line is determined by the attack capability of the player character 4 set to be the attacker that successively calculated when the player designates the selection path. Specifically, the path line drawn on the board 20 represents the selection path, and also represents the player character 4 that implements an attack, and the strength of the attack that is implemented by the selection path.

Again referring to FIG. 14, the user management data 600 is provided corresponding to each user who has been registered as the player of the online game provided by the server system 1100. The user management data 600 includes a specific player ID 601, an available player character list 603, and save data 610, for example. The user management data 600 may also appropriately include information such as play date/time history data and charge history data in a linked manner.

The save data 610 includes various types of data that describe the progress of the game when the data was saved. For example, the save data 610 includes a stage clear history 611 that includes the number of the cleared stage, and one piece or a plurality of pieces of player character status data 613 that describes the state of each player character. The player character status data 613 includes a specific player character ID (character type+serial number), a character level, information about an item possessed by the player character, and the like in a linked manner. Note that the save data 610 may optionally include additional data. For example, the save data 610 may include a player level, a play date/time history, a charge history, and the like.

The play data 700 is provided corresponding to each game play, and includes data necessary for implementing the game according to one embodiment of the invention, and various types of data that describe the progress of the game.

Figure 17:
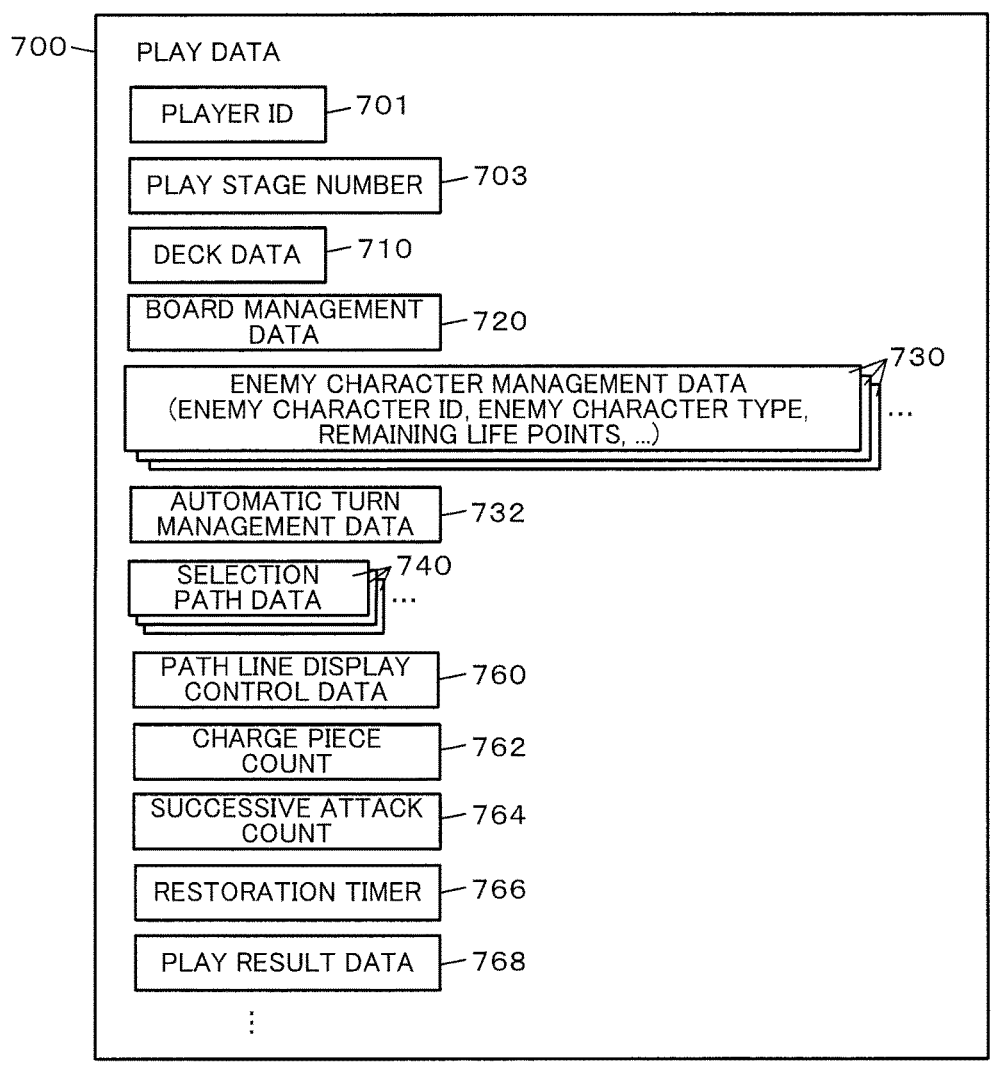
FIG. 17 is a view illustrating a data configuration example of play data.

As illustrated in FIG. 17, the play data 700 includes a player ID 701, a play stage number 703, deck data 710, board management data 720, enemy character management data 730, automatic turn management data 732, selection path data 740, path line display control data 760, a charge piece count 762, a successive attack count 764, a restoration timer 766, and play result data 768, for example. Note that the play data 700 may optionally include additional data.

Figure 18:
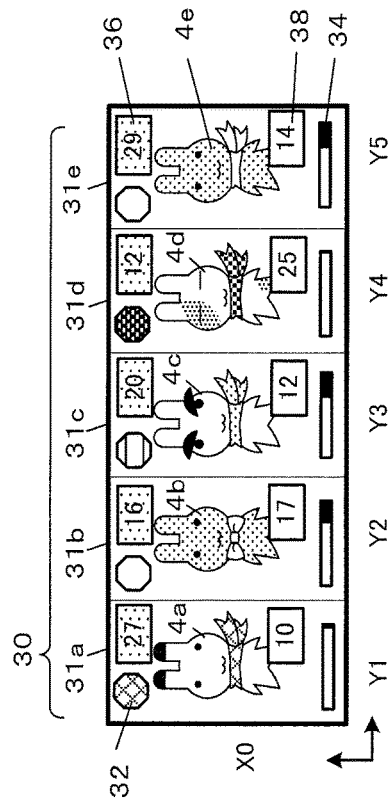
FIG. 18 is a view illustrating a data configuration example of deck data.

FIG. 18 is a view illustrating a data configuration example of the deck data 710.

The deck data 710 is data that manages the deck 30. The deck data 710 includes various types of data that describe the state of the deck 30, and the state of the player character 4 used in the game. For example, the deck data 710 includes a character placement position ID 711 that represents the placement frame, placement coordinates 712 of the placement frame, a specific character ID 713 that represents the player character 4 placed in the placement frame, a character level 714, remaining life points 715, integrated skill points 716, and a character attribute 717 in a linked manner. Note that the deck data 710 may optionally include additional data.

The coordinate system of the placement coordinates 712 is the same as that of the board 20.

The remaining life points 715 represent the remaining life points displayed in the individual life display area 34.

The integrated skill points 716 represent the integrated (total) number of non-playable character pieces 22n that have been deleted in a state in which the player character 4 is set to be the attacker (i.e., the start point of the selection path). A value obtained by subtracting the integrated skill points 716 from the skill implementation threshold value 549 included in the initial parameter library 540 of the player character 4 is displayed in the required skill point display area 38.

Figure 19:
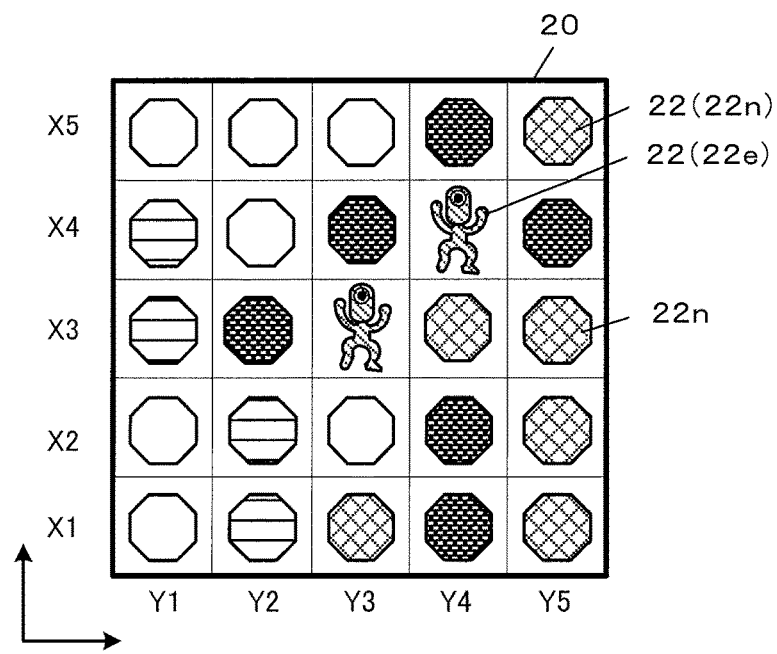
FIG. 19 is a view illustrating a data configuration example of board management data.

FIG. 19 is a view illustrating a data configuration example of the board management data 720.

The board management data 720 includes various types of data that describe the placement state of the puzzle pieces 22 on the board 20. For example, the board management data 720 includes placement coordinates 721 (e.g., the coordinates of each piece placement frame), a placed piece type 722 that represents the puzzle piece 22 placed in the piece placement frame, and a restoration target type 723 in a linked manner.

The placed piece type 722 is set to "white", "horizontal-striped", "cross-hatched", "densely-hatched", "free", "NULL (i.e., no puzzle piece 22 is placed)", or "enemy character ID". The placed piece type 722 is set to an identical type (excluding "enemy character ID" and "NULL") during the bonus time (see FIG. 12) for canceling the no-solution state.

The restoration target type 723 is referred to after completion of the bonus time (see FIG. 12) in order to return the type of each puzzle piece 22 to the original type. The initial value is set to a given value (NULL) that represents "unspecified". The type of puzzle piece 22 is copied from the placed piece type 722 when the bonus time starts.

Again referring to FIG. 17, the enemy character management data 730 is provided corresponding to each enemy character piece 22e placed on the board 20, and includes data that describes the state of the enemy character. The enemy character management data 730 includes a specific enemy character ID (character type+serial number), an enemy character type, and the remaining life points, for example. Note that the enemy character management data 730 may optionally include additional data.

The automatic turn management data 732 manages data for automatically switching between the player's turn and the enemy's turn. For example, the automatic turn management data 732 may include a count value of a timer that measures the time of each turn. In one embodiment of the invention, the timer measures the duration of the player's turn after the first selection path has been designated during the player's turn. Therefore, the player can take time to solve the puzzle. Note that the time may be measured immediately after completion of the enemy's turn (without waiting for the first selection path to be designated during the player's turn), and the player's turn may be automatically switched to the enemy's turn when a given time has been reached.

Figure 20:
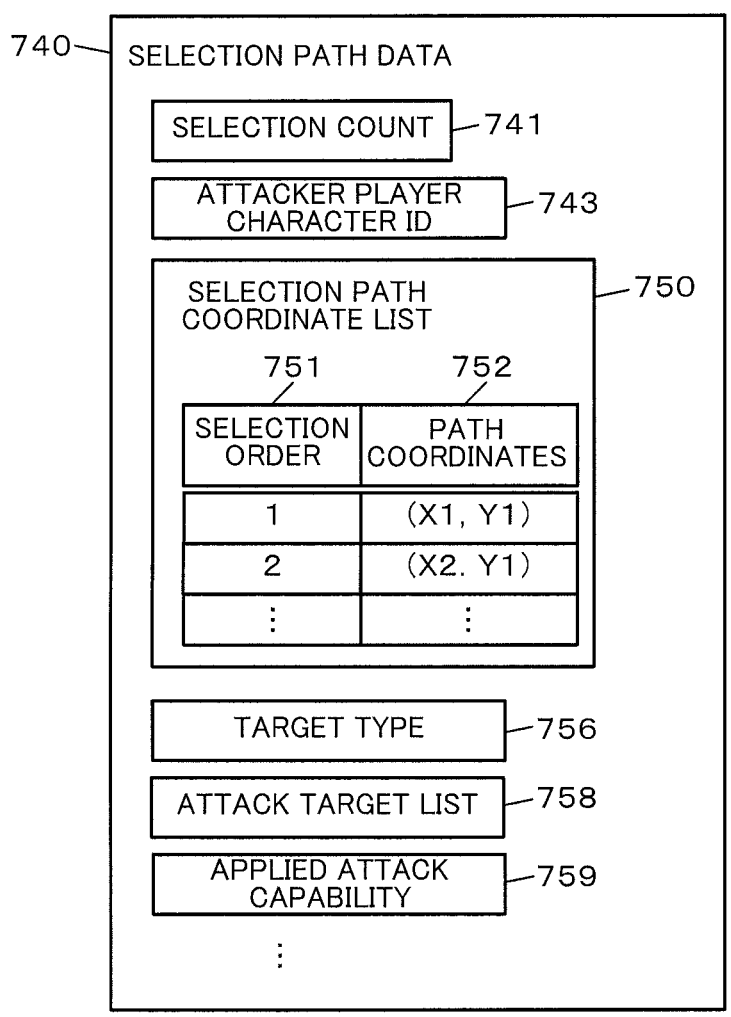
FIG. 20 is a view illustrating a data configuration example of selection path data.

The selection path data 740 is provided corresponding to each selection path designated during one player's turn, and includes various types of data that defines the selection path. As illustrated in FIG. 20, the selection path data 740 includes a selection count 741, an attacker player character ID 743, a selection path coordinate list 750, a target type 756, an attack target list 758, and an applied attack capability 759, for example. Note that the selection path data 740 may optionally include additional data.

The selection count 741 represents the number of puzzle pieces 22 selected to be the selection path. The initial value is set to "0".

The attacker player character ID 743 represents the player character that implements an attack upon completion of the designation of the selection path. Specifically, the attacker player character ID 743 represents the player character that corresponds to the start point of the selection path.

The selection path coordinate list 750 includes information that defines the selection path. For example, the selection path coordinate list 750 includes a selection order 751 and path coordinates 752 in a linked manner. The path coordinates 752 represent the position coordinates of the puzzle pieces 22 selected to be the selection path on the board 20. In one embodiment of the invention, the path coordinates 752 represent the coordinates of the piece placement frames on the board 20 in which the puzzle pieces 22 selected to be the selection path are placed.

The target type 756 represents the target type that corresponds to the selection path. The initial value is set to a given value (NULL) that represents "unspecified". The target type 756 is set to the type of the puzzle piece 22 of which the selection order 751 is "1", and is reset when the free piece 22f has appeared in the selection path.

The attack target list 758 is a list of the character ID of the enemy character pieces 22e that lie in the selection path.

The applied attack capability 759 includes the parameter value of the attack capability that is applied to an attack implemented after completion of the designation of the selection path. The applied attack capability 759 is updated corresponding to a selection path designation operation input.

Again referring to FIG. 17, the path line display control data 760 is display control data for the path line 7 (see FIG. 4).

The charge piece count 762 includes the integrated (total) number of non-playable character pieces 22n deleted in connection with the selection path in which the enemy character piece 22e does not lie. The initial value is set to "0". The number of non-playable character pieces 22n deleted in connection with the selection path in which the enemy character piece 22e does not lie is added to the value represented by the charge piece count 762, and the charge piece count 762 is reset to "0" when the player character 4 has implemented an attack. The attack capability of the player character 4 is calculated using the current charge piece count 762.

The successive attack count 764 represents the number of attacks implemented by the player character 4 during the current player's turn. The successive attack count 764 is reset to "1" (initial value) when the enemy's turn has been switched to the player's turn, and "1" is added to the successive attack count 764 when the player character 4 has implemented an attack.

The restoration timer 766 is used to measure the remaining time until the type of puzzle piece 22 that has been temporarily changed to cancel the no-solution state is returned to the original type.

Operation

The operation of the server system 1100 is described below.

Figure 21:
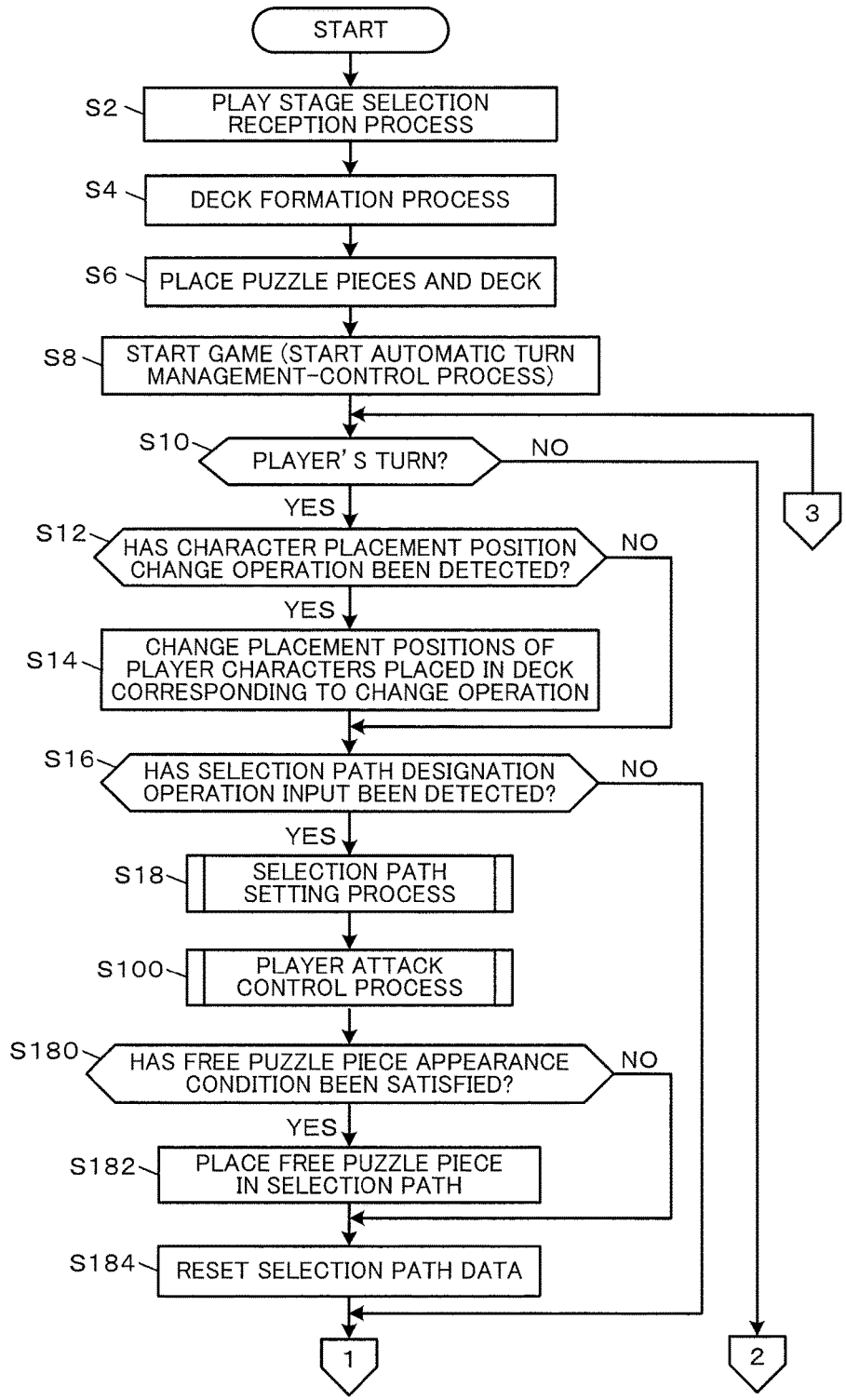
FIG. 21 is a main flowchart illustrating the flow of a process performed by a server system.
Figure 22:
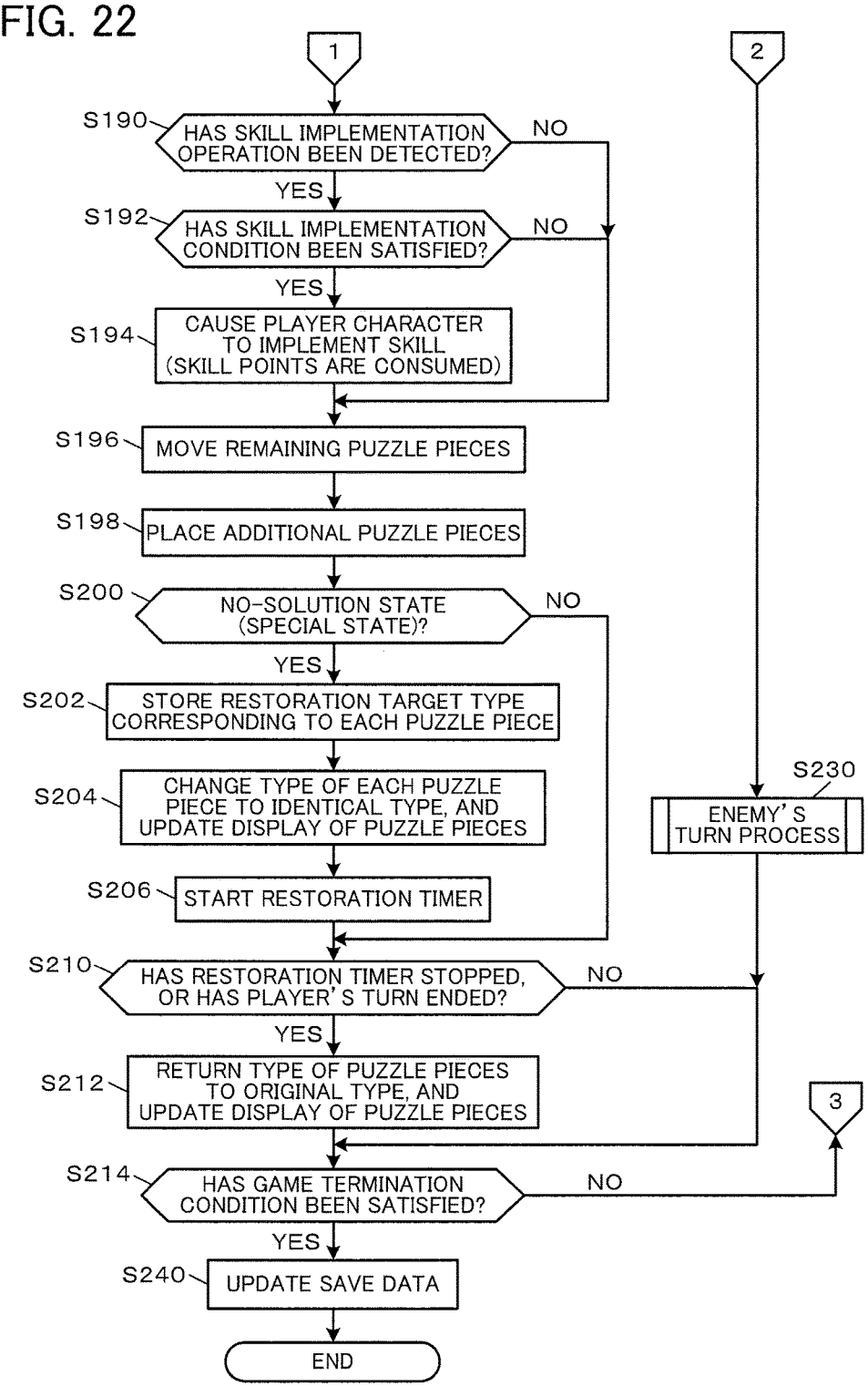
FIG. 22 is a flowchart that follows from the flowchart illustrated in FIG. 21.

FIGS. 21 and 22 are flowcharts illustrating the flow of the main process performed by the server system 1100. Note that FIGS. 21 and 22 illustrate an example of the flow of the main process that corresponds to one stage for convenience of explanation. The flow of the process described below is implemented by causing the server system 1100 to execute the server program 502. The player terminal 1500 has downloaded and executed the client program 503, the available player characters have been registered in advance, and the login process has been completed. The play result data 768 (see FIG. 17) is updated appropriately.

As illustrated in FIG. 21, the server system 1100 performs a play stage selection reception process (step S2). The server system 1100 sets the play stage number 703 (see FIG. 18) corresponding to a selection input performed by the player. For example, the server system 1100 sets the play stage number 703 to "1" when the player plays the game from the beginning, and sets the play stage number 703 to the stage number read from the stage clear history 611 included in the save data 610 of the player (see FIG. 14) when the player plays the game from the point at which the player suspended the game.

The server system 1100 then performs a deck formation process (step S4).

Specifically, the server system 1100 displays the available player character list 603 (i.e., a list of the available player characters registered by the player in advance (see FIG. 14), and a list of the player characters 4 included in the player character status data 613 included in the save data 160, and selects the player character 4 (in a number equal to or smaller than a given number) that is placed in the deck 30 corresponding to a selection operation input performed by the player. The server system 1100 determines the placement position of the selected player character 4 in the deck 30 corresponding to an operation input. The information about the player character 4 of which the placement position has been determined is set to the deck data 710 included in the play data 700 (see FIG. 17) (see FIG. 18).

The server system 1100 then places the puzzle pieces 22 on the board 20, and places the deck 30 (step S6). The server system 1100 randomly places the enemy character piece 22e and the non-playable character piece 22n set (designated) to the stage initial setting data 512 (see FIG. 15) that corresponds to the current play stage number 703. Note that the server system 1100 may place the puzzle pieces 22 based on given placement rules.

The server system 1100 then starts the game (step S8). When the game has started, the server system 1100 starts an automatic turn management process. Specifically, the server system 1100 switches the player's turn to the enemy's turn when a given time has elapsed after the first selection path designation operation input has been detected (after the first touch to the touch panel 1506 during the player's turn has been detected), and switches the enemy's turn to the player's turn when a given time has elapsed during the enemy's turn, or an automatic action control process on the enemy character has started. The turn switching process is automatically performed thereafter.

When the server system 1100 has detected that a slide operation has been performed on the player character 4 displayed in the deck 30 during the player's turn, the server system 1100 determines that a character placement position change operation has been detected (YES in step S12), and changes the placement positions of the player characters 4 placed in the deck 30 corresponding to the character placement position change operation (step S14).

When the server system 1100 has detected that a selection path designation operation input (touch to the touch panel 1506) has been performed during the player's turn (YES in step S16), the server system 1100 performs a selection path setting process (step S18).

Figure 23:
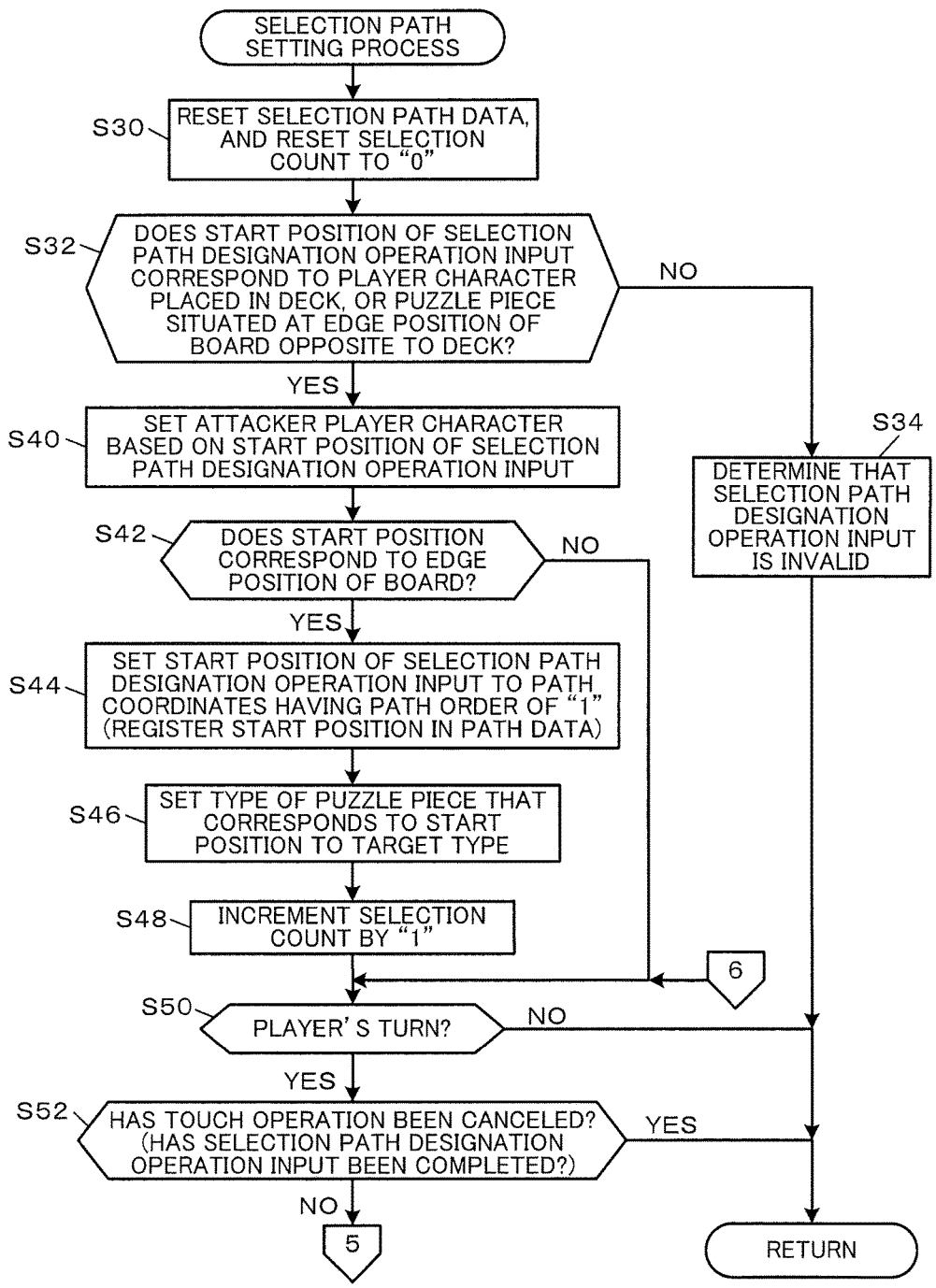
FIG. 23 is a flowchart illustrating the flow of a selection path setting process.
Figure 24:
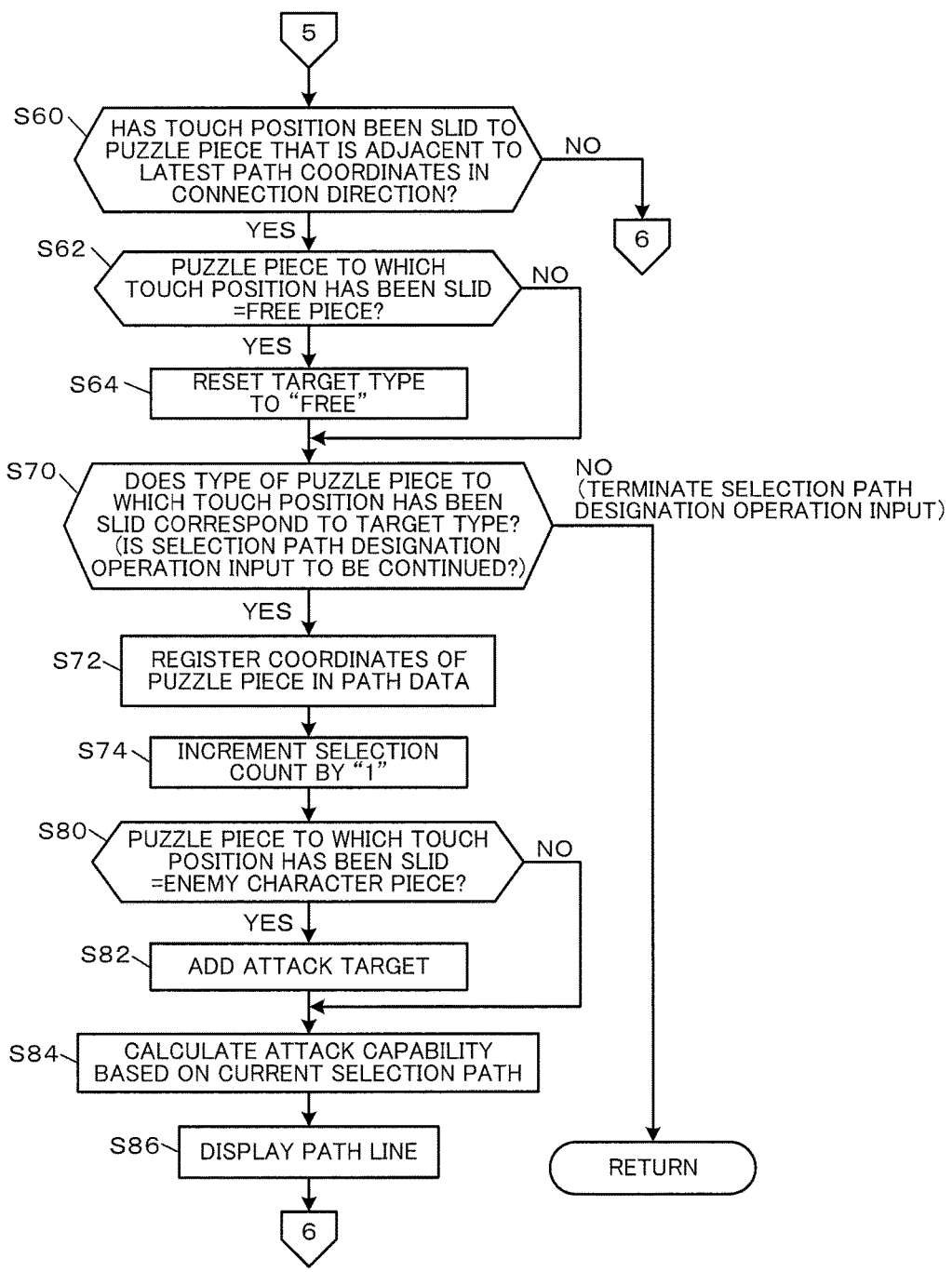
FIG. 24 is a flowchart that follows the flowchart illustrated in FIG. 23.

FIGS. 23 and 24 are flowcharts illustrating the flow of the selection path setting process.

The server system 1100 resets the selection path data 740 (see FIGS. 17 and 20) (step S30). The selection number 741 is thus reset to "0".

The server system 1100 determines whether or not the start position of the selection path designation operation input corresponds to one of the player characters 4 placed in the deck 30, or the puzzle piece 22 situated at the edge position of the board 20 opposite to the deck 30 (step S32).

When the server system 1100 has determined that the start position of the selection path designation operation input does not correspond to one of the player characters 4 placed in the deck 30, or the puzzle piece 22 situated at the edge position of the board 20 opposite to the deck 30 (NO in step S32), the server system 1100 determines that the selection path designation operation input is invalid (step S34), and terminates the selection path setting process.

When the server system 1100 has determined that the start position of the selection path designation operation input corresponds to one of the player characters 4 placed in the deck 30, or the puzzle piece 22 situated at the edge position of the board 20 opposite to the deck 30 (YES in step S32), the server system 1100 determines that the start position of the selection path designation operation input is appropriate as the start point of the selection path, and sets the attacker player character ID 743 included in the selection path data 740 (see FIG. 20) based on the start position (step S40). More specifically, when the start position corresponds to one of the player characters 4 placed in the deck 30, the player character 4 is set to the attacker player character ID 743. When the start position corresponds to the puzzle piece 22 situated at the edge position of the board 20, or the piece placement frame in which the puzzle piece 22 is placed, the player character 4 placed at the character placement position of the deck 30 and situated opposite to the puzzle piece 22 or the piece placement frame is set to the attacker player character ID 743.

When the start position corresponds to the edge position of the board 20 (YES in step S42), the server system 1100 registers the start position in the selection path coordinate list 750 (step S44). The server system 1100 sets the type of the puzzle piece 22 that corresponds to the start position to the target type 756 (step S46), and increments the selection count 741 by "1" (step S48).

When the puzzle piece 22 that corresponds to the start position is one of the four basic non-playable character pieces 22n, the type of the puzzle piece 22 is set to the target type 756. When the puzzle piece 22 that corresponds to the start position is the enemy character piece 22e or the free piece 22f, a given value (e.g., NULL) that represents "not set", "free", or "unlimited" is set to the target type 756.

When the player's turn has ended after the starting point of the selection path has been input (NO in step S50), the server system 1100 terminates the selection path setting process.

When completion of the selection path designation operation input has been detected after the starting point of the selection path has been input (YES in step S52), the server system 1100 also terminates the selection path setting process. More specifically, when the player has removed the finger from the touch panel 1506, the server system 1100 determines that completion of the selection path designation operation input has been detected. When completion of the selection path designation operation input has been detected (YES in step S52), the server system 1100 terminates the selection path setting process.

When the touch position has been slid to the puzzle piece 22 that is adjacent to the latest path coordinates 752 (see FIG. 20) in a given connection direction (YES in step S60) in a state in which the player's turn has not ended, and the selection path designation operation input has not ended (NO in step S52), the server system 1100 refers to the board management data 720 (see FIG. 19) to acquire the type of the puzzle piece 22 to which the touch position has been slid. When the puzzle piece 22 to which the touch position has been slid is the free piece 22f (YES in step S62), the server system 1100 resets the target type 756 to "free (i.e., unlimited)" (step S64). When the puzzle piece 22 to which the touch position has been slid is one of the four basic non-playable character pieces 22n or the enemy character pieces 22e (NO in step S62), the server system 1100 maintains the target type 756.

The server system 1100 then determines whether or not the type of the puzzle piece 22 to which the touch position has been slid corresponds to the type represented by the target type 756. The server system 1100 determines that the type of the puzzle piece 22 to which the touch position has been slid does not correspond to the type represented by the target type 756 when the type of the puzzle piece 22 to which the touch position has been slid is not identical to, or is not considered to be identical to, the type represented by the target type 756 (NO in step S70), determines that the selection path input has been completed, and terminates the selection path setting process. The server system 1100 determines that the type of the puzzle piece 22 to which the touch position has been slid corresponds to the type represented by the target type 756 when the type of the puzzle piece 22 to which the touch position has been slid is not identical to, or is not considered to be identical to, the type represented by the target type 756 (YES in step S70), adds the path coordinates 752 of the puzzle piece 22 to which the touch position has been slid to the selection path coordinate list 750 (step S72), and increments the selection count 741 by "1" (step S74).

When the puzzle piece 22 to which the touch position has been slid is the enemy character piece 22e (YES in step S80), the server system 1100 adds the enemy character ID of the enemy character piece 22e to the attack target list 758 (step S82).

The server system 1100 then calculates the attack capability of the player character 4 set to be the attacker based on the current selection path designation state (step S84).

More specifically, the server system 1100 reads the character level L (character level 714 (see FIG. 18)) of the player character 4 set to be the attacker from the deck data 710. The server system 1100 compares the selection path coordinate list 750 and the board management data 720, and adds the charge piece count 762 to the number of non-playable character pieces 22n that lie in the current selection path to calculate the number N of non-playable character pieces 22n deleted due to the selection path designation operation input. The server system 1100 refers to the target type 756, the character attribute 717 (see FIG. 18) of the player character 4 set to be the attacker, and the piece type compatibility value definition table 543 (see FIG. 16), and reads the compatibility value M between the player character 4 set to be the attacker and the non-playable character pieces 22n that lie in the selection path. The server system 1100 calculates the attack capability based on the attack capability calculation function 544 (see FIG. 16) of the player character 4 set to be the attacker, and sets the calculated attack capability to the applied attack capability 759 (see FIG. 20).

The server system 1100 then displays the path line 7 along the selection path so as to have the type defined by the path line display state setting table 560 (see FIG. 15) and the thickness corresponding to the calculated attack capability (step S86), and performs the step S50 again.

When the server system 1100 has determined that the type of the puzzle piece 22 to which the touch position has been slid does not correspond to the target type in the step S70 (NO in step S70), the server system 1100 determines that the selection path designation rules are not met, and terminates the selection path setting process. Specifically, the server system 1100 determines that the selection path has ended upon selection of the preceding puzzle piece 22, and terminates the selection path designation (selection) input.

The server system 1100 then performs a player attack control process (step S100) (see FIG. 21 (flowchart)).

Figure 25:
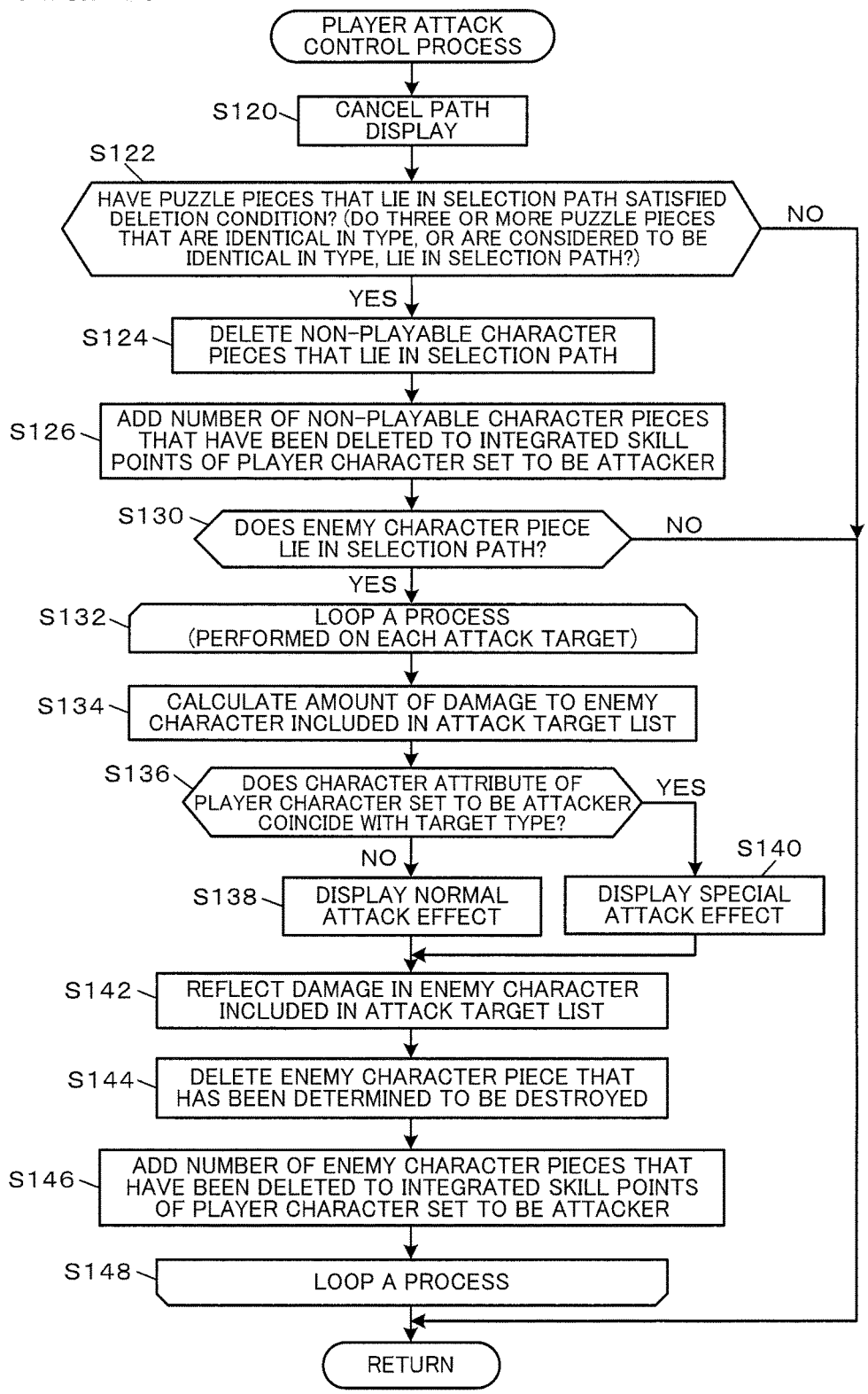
FIG. 25 is a flowchart illustrating the flow of a player attack control process.

FIG. 25 is a flowchart illustrating the flow of the player attack control process.

The server system 1100 cancels the display of the path line 7 (step S120). The server system 1100 then determines whether or not the puzzle pieces 22 that lie in the selection path represented by the selection path data 740 have satisfied a given deletion condition (step S122). In one embodiment of the invention, it is determined that the deletion condition has been satisfied when the number of puzzle pieces 22 that lie in the selection path is equal to or larger than a given number (e.g., "3"), and the puzzle pieces 22 are identical in type, or are considered to be identical in type.

When the deletion condition has been satisfied (YES in step S122), the server system 1100 deletes the non-playable character pieces 22n that lie in the selection path from the board 20 (step S124), and adds the number of non-playable character pieces 22n that have been deleted to the integrated skill points 716 (see FIG. 18) of the player character 4 set to be the attacker (step S126).

The server system 1100 then determines whether or not the enemy character piece 22e lies in the selection path.

When the enemy character piece 22e lies in the selection path (YES in step S122), the server system 1100 performs a loop A process on each enemy character piece 22e registered in the attack target list 758 (steps S132 to S148).

In the loop A process, the server system 1100 calculates the amount of damage to the processing target enemy character piece 22e (step S134). The amount of damage is calculated using a given method based on the defense parameter value of the enemy character piece 22e included in the attack target list 758, and the applied attack capability 759.

When the character attribute of the player character 4d set to be the attacker does not coincide with the type of non-playable character pieces 22n that lie in the selection path (NO in step S136), the server system 1100 displays the normal attack effect 60 that implements an attack using the calculated amount of damage corresponding to the processing target enemy character piece 22e (step S138 (see FIG. 5)). When the character attribute of the player character 4d set to be the attacker coincides with the type of non-playable character pieces 22n that lie in the selection path (YES in step S136), the server system 1100 displays the special attack effect 62 that implements an attack using the calculated amount of damage corresponding to the processing target enemy character piece 22e (step S140 (see FIG. 9)).

The server system 1100 then reflects the damage in the processing target enemy character piece 22e (step S142). When the life points of the enemy character piece 22e have reached "0" as a result of reflecting the damage, the server system 1100 determines that the enemy character piece 22e has been destroyed, deletes the enemy character piece 22e from the board 20 (step S144), and adds the number of enemy character pieces 22e that have been deleted to the integrated skill points 716 of the player character 4 set to be the attacker (step S146). The server system 1100 then terminates the loop A process (step S148).

When the server system 1100 has performed the loop A process on all of the attack target enemy character pieces 22e, the server system 1100 terminates the player attack control process.

Again referring to FIG. 21, the server system 1100 determines whether or not a free piece (22f) appearance condition has been satisfied. The server system 1100 determines that the free piece (22f) appearance condition has been satisfied when the number of non-playable character pieces 22n that lie in the selection path is equal to or larger than a given value (e.g., "5").

When the server system 1100 has determined that the free piece (22f) appearance condition has been satisfied (YES in step S180), the server system 1100 places the free piece 22f in the selection path (step S182 (see FIG. 9)), and resets the selection path data 740 (see FIG. 20) (step S184). When the server system 1100 has determined that the free piece (22f) appearance condition has not been satisfied (NO in step S180), the server system 1100 resets the selection path data 740 without placing the free piece 22f.

As illustrated in FIG. 22, when a given skill implementation operation has been detected during the player's turn (YES in step S190), the server system 1100 determines whether or not the player character 4 that has been operated has satisfied the skill implementation condition (step S192). In one embodiment of the invention, it is determined that the player character 4 that has been operated has satisfied the skill implementation condition when the integrated skill points 716 (see FIG. 18) of the player character 4 have reached the skill implementation threshold value 549 (see FIG. 16) of the player character 4.

When the server system 1100 has determined that the player character 4 that has been operated has satisfied the skill implementation condition (YES in step S192), the server system 1100 causes the player character 4 to implement the skill defined by the skill definition data 547 (see FIG. 16), and resets the integrated skill points 716 to "0" in compensation for the implementation of the skill (step S194).

The server system 1100 then moves the puzzle pieces 22 that remain on the board 20 (step S196 (see FIG. 7)), and places new puzzle pieces 22 at the empty piece placement positions (step S198).

When the no-solution state has occurred during the player's turn (YES in step S200), the server system 1100 copies the placed piece type 722 included in the board management data 720 (see FIG. 19) to the corresponding restoration target type 723 (step S202). The server system 1100 changes the placed piece type 722 of each puzzle piece 22 to one type that has been randomly selected to update the display of the puzzle pieces 22 placed on the board 20 (step S204 (see FIG. 12)), and starts the restoration timer 766 (step S206).

When the restoration timer 766 has stopped, or when the player's turn has ended (YES in step S210), the server system 1100 returns the type of the puzzle piece 22 for which the restoration target type 723 is stored (excluding "NULL") to the original type represented by the restoration target type 723, and resets the restoration target type 723 to "NULL" to update the display of the puzzle pieces 22 placed on the board 20 (step S212). The process performed during the player's turn is thus completed.

When the enemy's turn has started (NO in step S10), the server system 1100 performs an enemy's turn process (step S230). Specifically, the server system 1100 causes one or more enemy character pieces 22e placed on the board 20 to attack one or more player characters 4. The remaining life points 715 (see FIG. 18) of the player character 4 that has been attacked by the enemy character piece 22e are decremented corresponding to the amount of damage. The player character 4 is deleted from the board 20 when the remaining life points 715 of the player character 4 have reached "0".

The steps S10 to S230 are repeated until a given game termination condition is satisfied.

In one embodiment of the invention, it is determined that the game termination condition has been satisfied when all of the enemy character pieces 22e that appear in the current stage have been deleted, or all of the player characters 4 have been destroyed.

When the game termination condition has been satisfied, the server system 1100 terminates the current stage, updates the save data 610 (see FIG. 14) of the player (step S240), and terminates the process. Note that the save data 610 is updated while appropriately changing the character level of the player character 4 placed in the deck 30 corresponding to the play result data 768 so that the character grows.

According to the embodiments of the invention, it is possible to improve the interest of the puzzle game.

Specifically, the player can select the desired player character 4 to be the attacker at the start point when designating the selection path that selects arbitrary puzzle pieces 22, and designate the attack target enemy character by designating the selection path so that the attack target enemy character piece 22e lies in the selection path. Moreover, the player can change the placement position of the player character 4 placed in the deck 30 during game play. It is possible to improve the interest of the puzzle game by utilizing the relationship between the board 20 and the deck 30 as an additional element that must be taken into consideration in order to solve the puzzle.

It is possible to further improve the interest of the puzzle game by dealing with the no-solution state using the bonus time, changing the display state of the path line 7 corresponding to the attack implemented by designation of the selection path, and changing the type of attack effect corresponding to the relationship between the target type that corresponds to the selection path and the character attribute of the player character 4 set to be the attacker.

Modifications

The embodiments to which the invention is applied have been described above. Note that the embodiments to which the invention can be applied are not limited to the embodiments described above. Various modifications may be appropriately made of the embodiments described above, such as providing an additional element, omitting some of the elements, or modifying some of the elements.

First Modification

Although the embodiments of the invention have been described taking an example in which the game is a puzzle RPG that includes a puzzle game as a game element, the embodiments of the invention may be appropriately applied to a game other than a puzzle RPG as long as the game includes a puzzle game as a game element. The embodiments of the invention may be applied to a puzzle game that includes only a puzzle game as a game element. For example, the embodiments of the invention may be applied to a puzzle breeding game in which a pet is used as the player character 4, food or the like is used as the enemy character piece 22e, and the player selects the desired pet at the start point of the selection path, and selects the type and the amount of food to be fed to the pet by designating the selection path. The second game that proceeds while being linked to the game element of the puzzle game may be a racing game, a strategic game, an action game, a music game, a sport game, or the like. The type of puzzle piece 22 may be appropriately set corresponding to the details of the second game. For example, when the second game is an RPG a racing game, or a strategic game, items, parts, supply goods, or the like may be used as the puzzle pieces 22, and the second game may be designed so that the player can acquire the puzzle pieces 22 by deleting the puzzle pieces 22.

Second Modification

Although the embodiments of the invention have been described above taking an example in which the game is an online game, the embodiments of the invention may also be applied to a game that is implemented by a stand-alone player terminal 1500.

Figure 26:
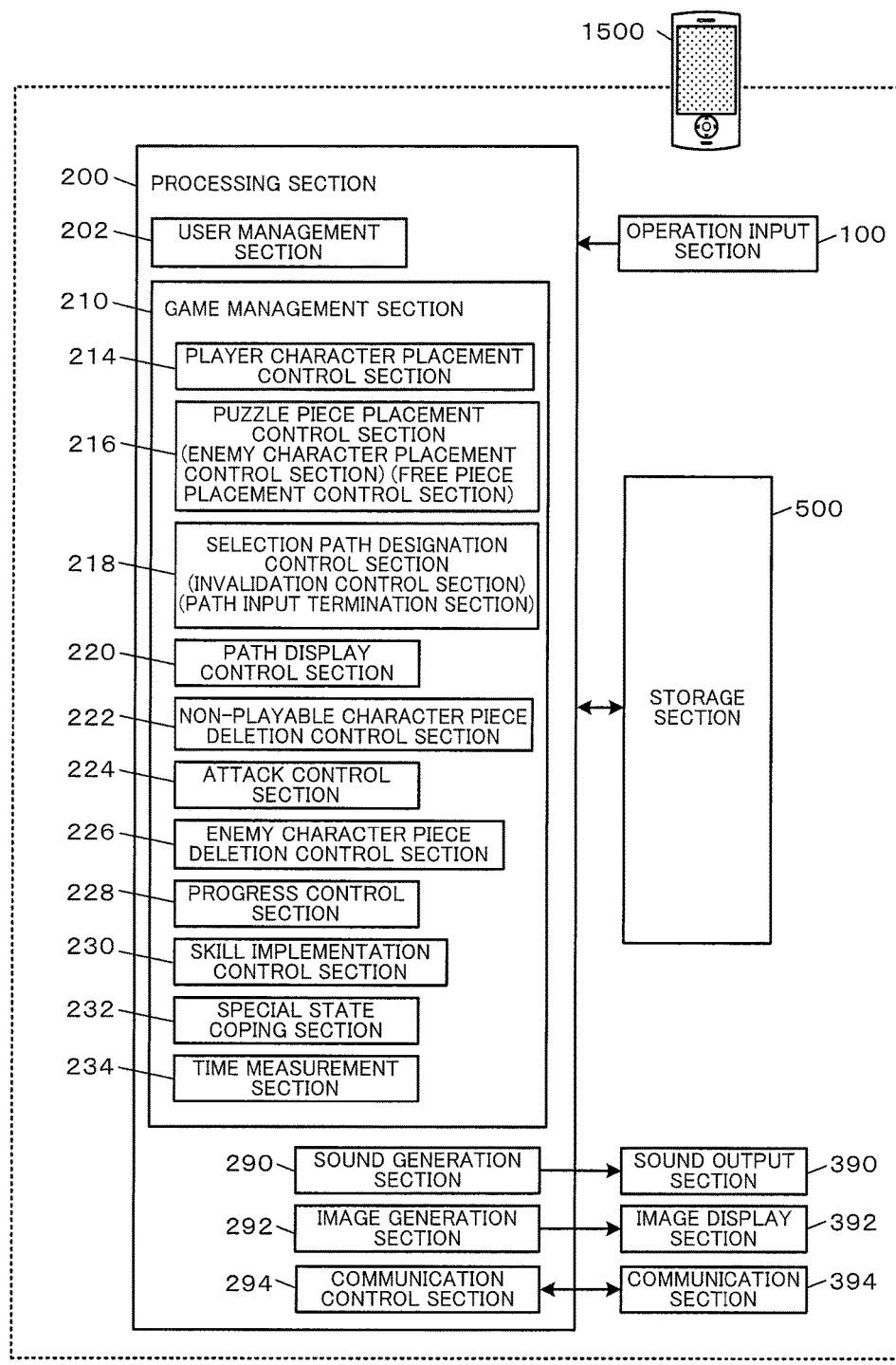
FIG. 26 is a functional block diagram illustrating a functional configuration example of a game device.
Figure 27:
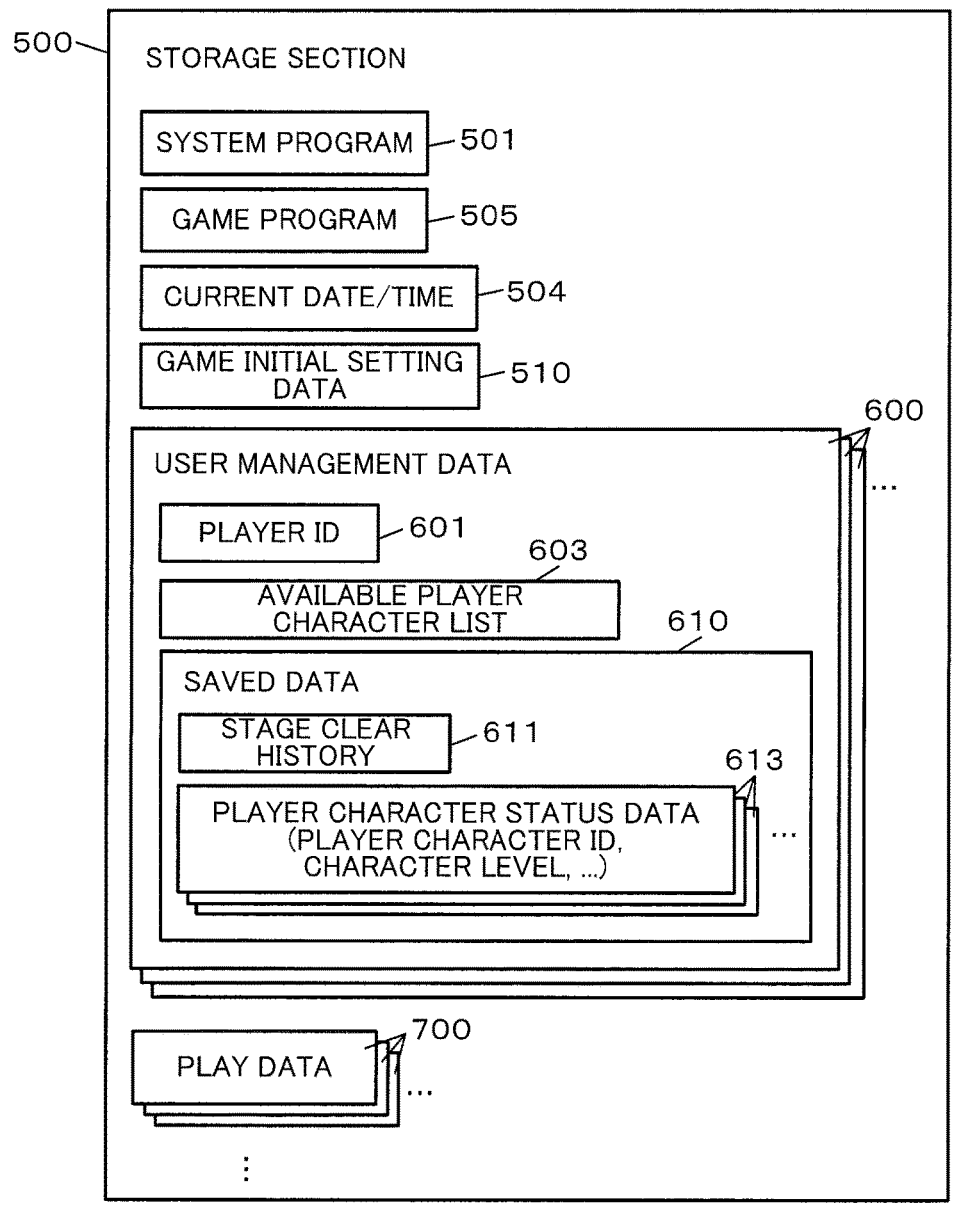
FIG. 27 is a view illustrating an example of a program and data that are stored in a storage section included in a game device.

In this case, the functional configuration illustrated in FIG. 13 is implemented by the player terminal 1500 (i.e., game device). For example, the functional configuration illustrated in FIG. 26 is employed. In this case, the arrow key 1502, the button switch 1504, and the touch panel 1506 (see FIG. 2) correspond to the operation input section 100. The CPU 1551 of the control board 1550 corresponds to the processing section 200, and the IC memory 1552 provided to the control board 1550 and the memory card 1540 correspond to the storage section 500. The speaker 1510 corresponds to the sound output section 390, the touch panel 1506 corresponds to the image display section 392, and the wireless communication module 1553 corresponds to the communication section 394. The programs and the data illustrated in FIG. 27 are stored in the storage section 500, for example. The game program 505 is a program that causes the processing section 200 to function as the user management section 202 and the game management section 210.

Third Modification

Although the embodiments of the invention have been described above taking an example in which rectangular piece placement positions (piece placement frames) are set to the board 20, one piece can be placed in one piece placement frame, and the player character 4 placed in the deck 30 is linked to the piece placement position on a one-to-one basis, the configuration is not limited thereto.

Figure 28:
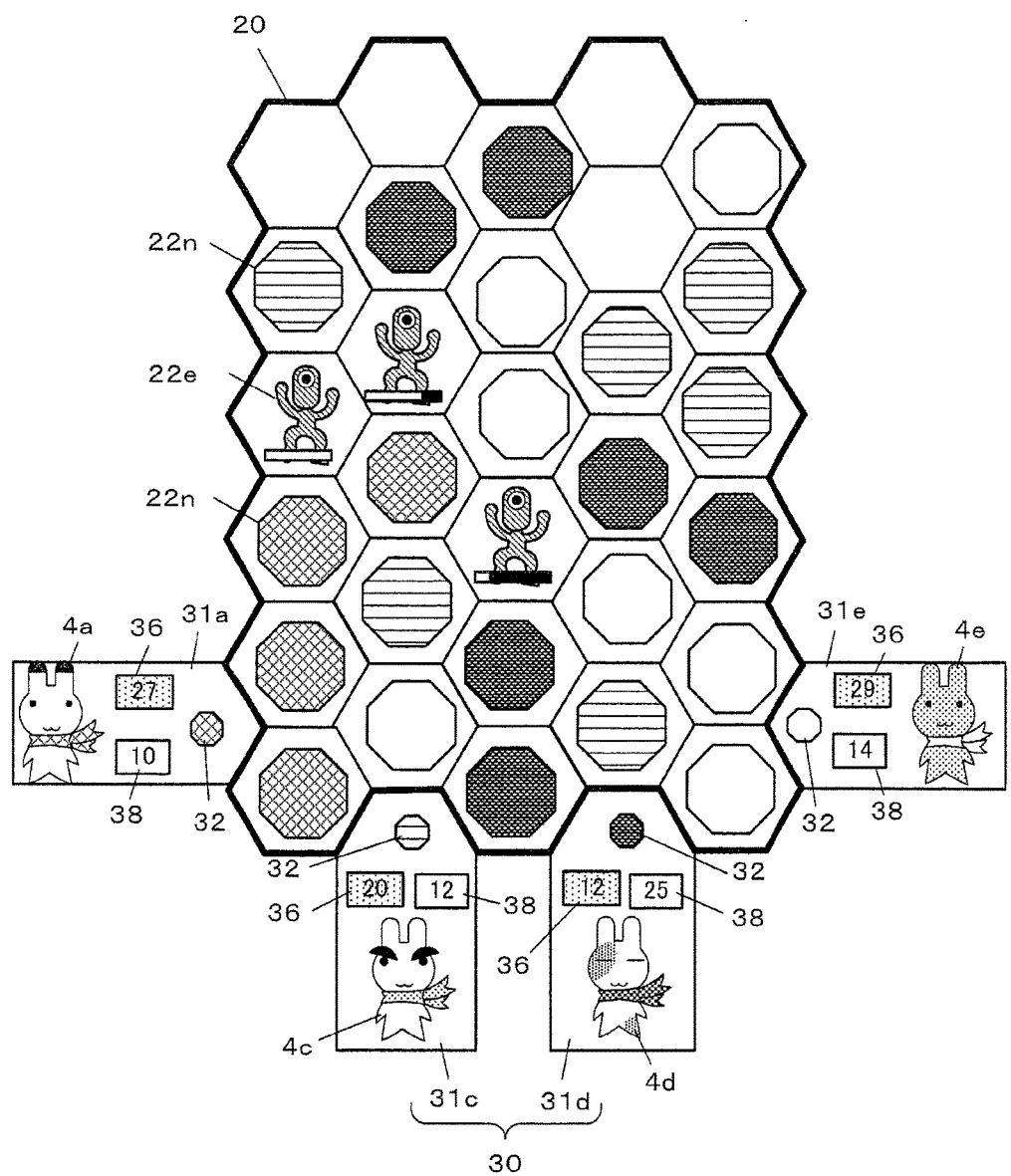
FIG. 28 is a view illustrating a modification of a board and a deck.

As illustrated in FIG. 28, the piece placement positions may be designed to have a hexagonal shape (i.e., a shape other than a rectangular shape), and the player character 4 placed in the deck 30 may be linked to a plurality of piece placement positions, for example. Although FIG. 28 illustrates an example in which the piece placement positions have a hexagonal shape, the piece placement positions may be designed to have a triangular shape or an octagonal shape.

The size of the piece placement position need not necessarily be larger than that of the puzzle piece 22. The size of the piece placement position may be the same as that of the puzzle piece 22.

Note that the piece placement position may be omitted. More specifically, the puzzle piece 22 may be put in a container (board 20) from the outside of the screen, and the behavior of the puzzle piece 22 may be calculated using virtual gravity that is applied to the container. In this case, the puzzle pieces 22 accumulate due to the virtual gravity, spontaneously collapse so as to fill the space formed by deletion, and additional puzzle pieces 22 in a number equal to the number of puzzle pieces 22 that have been deleted are supplied from the top of the container.

Note it is preferable to set the placement position of the player character 4 at a position that corresponds to the given edge position of the board 20 (see FIG. 28).

Fourth Modification

Although the embodiments of the invention have been described above taking an example in which the special state (no-solution state) is dealt with by changing the types of all of the puzzle pieces 22 placed on the board 20 to an identical type, the configuration is not limited thereto.

For example, the types of some of the puzzle pieces 22 placed on the board 20 may be changed to an identical type. Alternatively, the types of the puzzle pieces 22 placed on the board 20 may be changed to a plurality of limited types.

Although the embodiments of the invention have been described above taking an example in which the no-solution state is automatically detected and dealt with, the player who has become aware of the occurrence of the no-solution state may perform an operation input for dealing with the no-solution state. In this case, whether or not the operation input is correct (i.e., whether or not the no-solution state has actually occurred) is determined, and the special state is dealt with when the operation input is correct.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention.

What is claimed is:

1. A method for causing a computer to generate an image of a virtual space, and display the generated image on a display device, the method comprising:
    causing the computer to set a board within the virtual space, a plurality of pieces being placed on the board, the plurality of pieces including an enemy character piece that represents an enemy character;
    causing the computer to link a given position of an edge of the board (hereinafter referred to as "given edge position") to a given character placement position;
    causing the computer to place a player character at the character placement position;
    causing the computer to detect a path that has been drawn by a player by performing an operation input on the display device so as to draw the path from a start point, the start point being the character placement position;
    causing the computer to delete pieces among the plurality of pieces that have satisfied a given deletion condition from the board based on the path;
    causing the computer to perform a control process that causes the player character placed at a position that corresponds to the start point of the path to attack the enemy character piece when the enemy character piece lies in the path; and
    causing the computer to change a parameter value set to the enemy character piece based on a number of pieces deleted due to the operation input that draws the path, and a type of the player character placed at the position that corresponds to the start point of the path, when the enemy character piece lies in the path.

2. The method as defined in claim 1, further comprising:
    causing the computer to control deletion of the enemy character piece based on the parameter value.

3. The method as defined in claim 1, further comprising:
    causing the computer to change the character placement position corresponding to an operation input performed by the player.

4. The method as defined in claim 1, further comprising:
    causing the computer to change the parameter value using a number of successive attacks when the attack has been successively performed by repeating the operation input that draws the path.

5. The method as defined in claim 1, further comprising:
    causing the computer to perform a control process that repeatedly switches between a player's turn in which the player can input the path, and an enemy's turn in which the enemy character attacks the player character.

6. The method as defined in claim 5, further comprising:
    causing the computer to terminate the player's turn when a given time has elapsed, or a given turn count has been reached, after a first operation input that draws the path has been performed during the player's turn; and causing the computer to change the parameter value using a number of attacks when a plurality of attacks have been performed during the player's turn by repeating the operation input that draws the path.

7. The method as defined in claim 6, further comprising: causing the computer to change the given time or the given turn count.

8. The method as defined in claim 1, further comprising: causing the computer to display a path line that represents the path while changing a state of the path line using either or both of the number of pieces deleted due to the operation input that draws the path, and the type of the player character placed at the position that corresponds to the start point of the path.

9. The method as defined in claim 8, further comprising: causing the computer to change the state of the path line corresponding to the attack when the enemy character piece lies on the path line.

10. The method as defined in claim 1, further comprising: causing the computer to highlight the player character and the enemy character represented by the enemy character piece when performing the control process that causes the player character to attack the enemy character piece.

11. The method as defined in claim 1, wherein the plurality of pieces include pieces that respectively belong to given types, and a free piece that is determined to belong to each of the given types, the method further comprising:

causing the computer to place the free piece as the additional piece when a given implementation condition based on the number of pieces deleted has been satisfied.

12. The method as defined in claim 1, further comprising: causing the computer to perform a control process that counts the number of pieces deleted due to the operation input that draws the path corresponding to each player character placed at the position that corresponds to the start point of the path, and causes the player character for which the number of pieces deleted due to the operation input that draws the path has satisfied a given skill implementation threshold value condition, to implement a given skill.

13. The method as defined in claim 1, further comprising: causing the computer to detect a given special state in which the plurality of pieces are placed so that no piece can be deleted by the operation input that draws the path; and causing the computer to change types of the plurality of pieces placed on the board other than a piece that belongs to a given type, to an identical type when the special state has been detected.

14. The method as defined in claim 1, wherein the deletion condition includes a condition whereby the operation input that draws the path has been performed so that two pieces among the plurality of pieces are sequentially selected so as to satisfy a given connection condition with respect to a type, the method further comprising:

causing the computer to determine that the path has ended immediately before a piece among the plurality of pieces has been selected so as not to satisfy the connection condition, and terminates the operation input that draws the path when the connection condition has not been satisfied during the operation input that draws the path.

15. The method as defined in claim 1, wherein the display device is a touch panel, and the operation input that draws the path is performed by a touch operation.

16. An electronic device comprising a computer that generates an image of a virtual space, and displays the generated image on a display device, wherein the computer is configured to:

set a board within the virtual space, a plurality of pieces being placed on the board, the plurality of pieces including an enemy character piece that represents an enemy character;

link a given position of an edge of the board (hereinafter referred to as "given edge position") to a given character placement position;

place a player character at the character placement position;

detect a path that has been drawn by a player by performing an operation input on the display device so as to draw the path from a start point, the start point being the character placement position;

delete pieces among the plurality of pieces that have satisfied a given deletion condition from the board based on the path;

perform a control process that causes the player character placed at a position that corresponds to the start point of the path to attack the enemy character piece when the enemy character piece lies in the path; and change a parameter value set to the enemy character piece based on a number of pieces deleted due to the operation input that draws the path, and a type of the player character placed at the position that corresponds to the start point of the path, when the enemy character piece lies in the path.

17. A server system that communicates with a player terminal, and performs a control process that causes the player terminal to implement a puzzle game according to an operation input performed using the player terminal, the puzzle game being designed so that a player performs an operation input on a board on which a plurality of pieces are placed, the plurality of pieces including an enemy character piece that represents an enemy character, pieces among the plurality of pieces that have satisfied a given deletion condition are deleted, the server system being configured to:

link a given position of an edge of the board (hereinafter referred to as "given edge position") to a given character placement position;

place a player character at the character placement position;

detect a path that has been drawn by the player by performing the operation input using the player terminal so as to draw the path from a start point, the start point being the character placement position;

delete pieces among the plurality of pieces that have satisfied the deletion condition from the board based on the path;

perform a control process that causes the player character placed at a position that corresponds to the start point of the path to attack the enemy character piece when the enemy character piece lies in the path; and change a parameter value set to the enemy character piece based on a number of pieces deleted due to the operation input that draws the path, and a type of the player character placed at the position that corresponds to the start point of the path, when the enemy character piece lies in the path.

* * * * *